US012801519B2

(12) United States Patent
Wang

(10) Patent No.: US 12,801,519 B2
(45) Date of Patent: Nov. 17, 2026

(54) COMPUTATIONAL STORAGE SYSTEM, METHOD OF OPERATING THEREOF, AND ELECTRONIC SYSTEM

(71) Applicant: Yangtze Memory Technologies Co., Ltd., Wuhan (CN)

(72) Inventor: Tianyi Wang, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 0 days.

(21) Appl. No.: 19/055,750

(22) Filed: Feb. 18, 2025

(65) Prior Publication Data

US 2026/0140863 A1 May 21, 2026

Related U.S. Application Data

(63) Continuation of application No. PCT/CN2024/133601, filed on Nov. 21, 2024.

(51) Int. Cl.
*G06F 12/02* (2006.01)

(52) U.S. Cl.
CPC ................................ *G06F 12/0223* (2013.01)

(58) Field of Classification Search
CPC ................................................... G06F 12/0223
See application file for complete search history.

(56) References Cited

U.S. PATENT DOCUMENTS

2021/0181966 A1 6/2021 Xu et al.
2023/0114636 A1* 4/2023 Pandurangan ........ G06F 3/0607 711/154
2023/0124665 A1* 4/2023 Hong .................... G06F 3/0631 711/154
2024/0086102 A1 3/2024 Kachare et al.
2024/0231692 A1* 7/2024 Mahadevappa ....... G06F 3/0659
2024/0231694 A1 7/2024 Wu

FOREIGN PATENT DOCUMENTS

CN 117806557 A 4/2024
CN 118132248 A 6/2024
CN 118295582 A 7/2024

OTHER PUBLICATIONS

Extended European Search Report issued in corresponding European Application No. 2492450.4, 8 pages.

* cited by examiner

*Primary Examiner* — Larry T Mackall
(74) *Attorney, Agent, or Firm* — BAYES PLLC

(57) ABSTRACT

Examples of the present disclosure provide a computational storage system, a method of operating thereof, and an electronic system. The computational storage system may include a controller, a first memory coupled to the controller, and a computing processing component configured to execute a program. The controller may be configured to receive a command sent by a host coupled to the computational storage system. The command may instruct the computing processing component to execute the program, and the command may define association information of a respective address of at least one of input data or output data in a process of executing the program in the first memory. The controller may be configured to obtain the respective address of at least one of input data or output data in the process of executing the program in the first memory from the host according to the association information.

20 Claims, 10 Drawing Sheets

COMPUTATIONAL STORAGE SYSTEM, METHOD OF OPERATING THEREOF, AND ELECTRONIC SYSTEM

CROSS-REFERENCE TO RELATED APPLICATIONS

This application is a continuation of International Application No. PCT/CN2024/133601, filed on Nov. 21, 2024, which is incorporated herein by reference in its entirety.

TECHNICAL FIELD

The present disclosure relates to, but is not limited to, a computational storage system, an operation method thereof, and an electronic system.

BACKGROUND

Semiconductor memories may be roughly divided into two categories, depending on whether they retain stored data when powered down; these two types of semiconductor memories are: volatile memory and non-volatile memory, where volatile memory loses stored data when powered down, and non-volatile memory retains stored data when powered down.

SUMMARY

According to one aspect of the present disclosure, an electronic system is provided. The electronic system may include a host. The electronic system may include a computational storage system coupled to the host. The computational storage system may include a controller. The computational storage system may include a first memory coupled to the controller. The computational storage system may include a computing processing component configured to execute a program. The host may be configured to send a command. The command may instruct the computing processing component to execute the program. The command may define association information of a respective address of at least one of input data or output data in a process of executing the program in the first memory. The controller may be configured to receive the command. The controller may be configured to obtain the respective address of at least one of input data or output data in the process of executing the program in the first memory from the host according to the association information.

In some implementations, the command may carry first pointer information and at least one of a first parameter or a second parameter. In some implementations, the first parameter may include a number of input data in the process of executing the program. In some implementations, the second parameter may include a number of output data in the process of executing the program. In some implementations, the first pointer information may point to a first area in a buffer in the host. In some implementations, a respective address of each input data in the first memory and a respective address of each output data in the first memory may be stored in the first area.

In some implementations, the controller may be configured to obtain at least one of the respective address of each input data in the process of executing the program in the first memory or the respective address of each output data in the process of executing the program in the first memory from the buffer of the host according to the first pointer information and the at least one of first parameter or the second parameter.

In some implementations, the host may be configured to store the respective address of each input data in the process of executing the program in the first memory and the respective address of each output data in the process of executing the program in the first memory into the first area sequentially according to a first preset order. In some implementations, the controller may be configured to obtain at least one of the respective address of input data in the process of executing the program in the first memory or the respective address of output data in the process of executing the program in the first memory from the host according to a capacity size of the buffer occupied by each of the respective addresses of each input data and each output data in the first memory, information about the first preset order, the number of input data, and the number of output data.

In some implementations, the host may be configured to store the respective addresses of each input data and each output data in the process of executing the program in the first memory into the first area in the buffer of the host sequentially according to an order in which the respective address of the input data in the first memory is stored first and the respective address of the output data in the first memory is stored later. In some implementations, the host may be configured to store the respective addresses of each input data and each output data in the process of executing the program in the first memory into the first area in the buffer of the host sequentially according to an order in which the respective address of the output data in the first memory is stored first and the respective address of the input data in the first memory is stored later.

In some implementations, the command carries second pointer information. In some implementations, the second pointer information points to a second area in a buffer in the host. In some implementations, the second area stores a number of input data, the respective address of each input data in the first memory, a number of output data, and the respective address of each output data in the first memory.

In some implementations, the host may be configured to store the number of input data in the process of executing the program, the respective address of each input data in the first memory, the number of output data in the process of executing the program, and the respective address of each output data in the first memory into the second area sequentially according to a second preset order. In some implementations, the controller may be configured to obtain at least one of the respective address of input data in the process of executing the program in the first memory or the respective address of output data in the process of executing the program in the first memory from the host according to capacity sizes of the buffer occupied by each of the number of input data, the respective address of each input data in the first memory, the number of output data, the respective address of each output data in the first memory, information about the second preset order, the number of input data, and the number of output data.

In some implementations, the host may be configured to determine at least one of the number of input data in the process of executing the program or the number of output data in the process of executing the program according to functional characteristics of the program.

In some implementations, the command may carry at least one of third pointer information or fourth pointer information. In some implementations, the third pointer information may point to a third area in a buffer in the host. In some implementations, the third area may store the respective address of each input data in the process of executing the program in the first memory. In some implementations, the fourth pointer information may point to a fourth area in the buffer. In some implementations, the fourth area may store the respective address of each output data in the process of executing the program in the first memory. In some implementations, the controller may be configured to obtain the respective address of input data in the process of executing the program in the first memory from the host according to the address stored in the third area. In some implementations, the controller may be configured to obtain the respective address of output data in the process of executing the program in the first memory from the host according to the address stored in the fourth area.

In some implementations, a capacity size of the buffer occupied by the respective address of each input data in the first memory may be the same and is a first value. In some implementations, a capacity size of the buffer occupied by the respective address of each output data in the first memory may be the same and is a second value. In some implementations, the first value may be equal to the second value.

In some implementations, the respective address of each input data/output data in the first memory may include information about the first memory to which an area storing respective input data/output data belongs, a size of the input data/output data, and a starting address of the input data/output data in the first memory.

In some implementations, the computing processing component may be configured to read input data in a respective area of the first memory according to a respective address of input data in the process of executing the program in the first memory. In some implementations, the computing processing component may be configured to store output data obtained after the program has processed the input data into the respective area of the first memory according to a respective address of output data in the process of executing the program in the first memory.

In some implementations, the command may further a first identifier. In some implementations, the controller may be configured to obtain, based on a value of the first identifier being a third value, a respective address of input data in the process of executing the program in the first memory and a respective address of output data in the process of executing the program in the first memory according to the association information of respective addresses of the input data and the output data in the process of executing the program in the first memory defined by a program unique identifier carried in the command. In some implementations, the controller may be configured to obtain, based on a value of the first identifier being a fourth value, a respective address of input data in the process of executing the program in the first memory and a respective address of output data in the process of executing the program in the first memory from the host according to the association information of respective addresses of the input data and the output data in the process of executing the program in the first memory defined by the command.

In some implementations, the computational storage system may further include a second memory coupled to the controller. In some implementations, the controller may be configured to write input data in the process of executing the program stored in the second memory into the first memory. In some implementations, the controller may be configured to write output data in the process of executing the program stored in the first memory into the second memory.

In some implementations, the computational storage system may include a non-volatile namespace including the second memory. In some implementations, the computational storage system may include a computing namespace including the computing processing component. In some implementations, the computational storage system may include a sub-system local memory namespace including the first memory.

According to another aspect of the present disclosure, a computational storage system is provided. The computational storage system may include a first memory. The computational storage system may include a computing processing component configured to execute a program. The computational storage system may include a controller coupled to the first memory. The controller may be configured to receive a command sent by a host coupled to the computational storage system. The command may instruct the computing processing component to execute the program. The command may define association information of a respective address of at least one of input data or output data in a process of executing the program in the first memory. The controller may be configured to obtain the respective address of at least one of input data or output data in the process of executing the program in the first memory from the host according to the association information.

In some implementations, the command may carry first pointer information and at least one of a first parameter or a second parameter. In some implementations, the first parameter may include a number of input data in the process of executing the program. In some implementations, the second parameter may include a number of output data in the process of executing the program. In some implementations, the first pointer information may point to a first area in a buffer in the host. In some implementations, a respective address of each input data in the first memory and a respective address of each output data in the first memory are stored in the first area. In some implementations, a respective address of each input data in the process of executing the program in the first memory and a respective address of each output data in the process of executing the program in the first memory may be sequentially stored in the first area according to a first preset order.

In some implementations, the controller may be configured to obtain at least one of the respective address of each input data in the process of executing the program in the first memory or the respective address of each output data in the process of executing the program in the first memory from the buffer of the host according to the first pointer information and at least one of the first parameter or the second parameter.

In some implementations, the controller may be configured to obtain at least one of the respective address of input data in the process of executing the program in the first memory or the respective address of output data in the process of executing the program in the first memory from the host according to a capacity size of the buffer occupied by each of the respective addresses of each input data and each output data in the first memory, information about the first preset order, the number of input data, and the number of output data.

In some implementations, the first preset order may include an order in which the respective address of the input data in the first memory is stored first and the respective address of the output data in the first memory is stored later. In some implementations, the first preset order may include an order in which the respective address of the output data in the first memory is stored first and the respective address of the input data in the first memory is stored later.

In some implementations, the command may carry second pointer information. In some implementations, the second pointer information may point to a second area in a buffer in the host. In some implementations, the second area may store a number of input data, the respective address of each input data in the first memory, a number of output data, and the respective address of each output data in the first memory. In some implementations, the number of input data in the process of executing the program, the respective address of each input data in the first memory, the number of output data in the process of executing the program, and the respective address of each output data in the first memory are sequentially stored into the second area according to a second preset order.

In some implementations, the controller may be configured to obtain at least one of the respective address of input data in the process of executing the program in the first memory or the respective address of output data in the process of executing the program in the first memory from the host according to capacity sizes of the buffer occupied by each of the number of input data, the respective address of each input data in the first memory, the number of output data, the respective address of each output data in the first memory, information about the second preset order, the number of input data, and the number of output data.

In some implementations, the host may be configured to determine at least one of the number of input data in the process of executing the program or the number of output data in the process of executing the program according to functional characteristics of the program.

In some implementations, the command may carry at least one of third pointer information or fourth pointer information. In some implementations, the third pointer information may point to a third area in a buffer in the host. In some implementations, the third area may store the respective address of each input data in the process of executing the program in the first memory. In some implementations, the fourth pointer information may point to a fourth area in the buffer. In some implementations, the fourth area may store the respective address of each output data in the process of executing the program in the first memory. In some implementations, the controller may be configured to obtain the respective address of input data in the process of executing the program in the first memory from the host according to the address stored in the third area. In some implementations, the controller may be configured to obtain the respective address of output data in the process of executing the program in the first memory from the host according to the address stored in the fourth area.

In some implementations, a capacity size of the buffer occupied by the respective address of each input data in the first memory may be the same and is a first value. In some implementations, a capacity size of the buffer occupied by the respective address of each output data in the first memory may be the same and may be a second value. In some implementations, the first value may be equal to the second value.

In some implementations, the respective address of each input data/output data in the first memory may include information about the first memory to which an area storing respective input data/output data belongs, a size of the input data/output data, and a starting address of the input data/output data in the first memory.

According to a further aspect of the present disclosure, a method of operating a computational storage system is provided. The method may include receiving a command sent by a host coupled to the computational storage system. The command may instruct a computing processing component to execute a program. The command may define association information of a respective address of at least one of input data or output data in a process of executing the program in a first memory coupled to a controller of the computational storage system. The method may include obtaining the respective address of at least one of input data or output data in the process of executing the program in the first memory from the host according to the association information.

In some implementations, the command may carry first pointer information and at least one of a first parameter or a second parameter. In some implementations, the first parameter may include a number of input data in the process of executing the program. In some implementations, the second parameter may include a number of output data in the process of executing the program. In some implementations, the first pointer information may point to a first area in a buffer in the host. In some implementations, a respective address of each input data in the first memory and a respective address of each output data in the first memory may be stored in the first area. In some implementations, a respective address of each input data in the process of executing the program in the first memory and a respective address of each output data in the process of executing the program in the first memory may be sequentially stored in the first area according to a first preset order.

In some implementations, obtaining the respective address of at least one of input data or output data in the process of executing the program in the first memory from the host according to the association information may include obtaining at least one of the respective address of each input data in the process of executing the program in the first memory or the respective address of each output data in the process of executing the program in the first memory from the buffer of the host according to the first pointer information and at least one of the first parameter or the second parameter.

In some implementations, obtaining the respective address of at least one of input data or output data in the process of executing the program in the first memory from the host according to the association information may include obtaining at least one of the respective address of input data in the process of executing the program in the first memory or the respective address of output data in the process of executing the program in the first memory from the host according to a capacity size of the buffer occupied by each of the respective address information of each input data and each output data in the first memory, information about the first preset order, the number of input data, and the number of output data.

In some implementations, the first preset order may include an order in which the respective address of the input data in the first memory is stored first and the respective address of the output data in the first memory is stored later. In some implementations, the first preset order may include an order in which the respective address of the output data in the first memory is stored first and the respective address of the input data in the first memory is stored later.

In some implementations, the command may carry second pointer information. In some implementations, the second pointer information may point to a second area in a buffer in the host. In some implementations, the second area may store a number of input data, the respective address of each input data in the first memory, a number of output data, and the respective address of each output data in the first memory. In some implementations, the number of input data in the process of executing the program, the respective address of each input data in the first memory, the number of output data in the process of executing the program, and the respective address of each output data in the first memory may be sequentially stored into the second area according to a second preset order.

In some implementations, obtaining the respective address of at least one of input data or output data in the process of executing the program in the first memory from the host according to the association information may include obtaining at least one of the respective address of input data in the process of executing the program in the first memory or the respective address of output data in the process of executing the program in the first memory from the host according to capacity sizes of the buffer occupied by each of the number of input data, the respective address of each input data in the first memory, the number of output data, the respective address of each output data in the first memory, information about the second preset order, the number of input data, and the number of output data.

In some implementations, the method may include determining at least one of the number of input data in the process of executing the program or the number of output data in the process of executing the program according to functional characteristics of the program.

In some implementations, the command may carry at least one of third pointer information or fourth pointer information. In some implementations, the third pointer information may point to a third area in a buffer in the host. In some implementations, the third area may store the respective address of each input data in the process of executing the program in the first memory. In some implementations, the fourth pointer information may point to a fourth area in the buffer. In some implementations, the fourth area may store the respective address of each output data in the process of executing the program in the first memory. In some implementations, obtaining the respective address of at least one of input data or output data in the process of executing the program in the first memory from the host according to the association information may include obtaining the respective address of input data in the process of executing the program in the first memory from the host according to the address stored in the third area. In some implementations, obtaining the respective address of at least one of input data or output data in the process of executing the program in the first memory from the host according to the association information may include obtaining the respective address of output data in the process of executing the program in the first memory from the host according to the address stored in the fourth area.

In some implementations, a capacity size of the buffer occupied by the respective address of each input data in the first memory may be the same and is a first value. In some implementations, a capacity size of the buffer occupied by the respective address of each output data in the first memory may be the same and may be a second value. In some implementations, the first value is equal to the second value.

In some implementations, the respective address of each input data/output data in the first memory may include information about the first memory to which an area storing respective input data/output data belongs, a size of the input data/output data, and a starting address of the input data/output data in the first memory.

DETAILED DESCRIPTION

Figure 1:
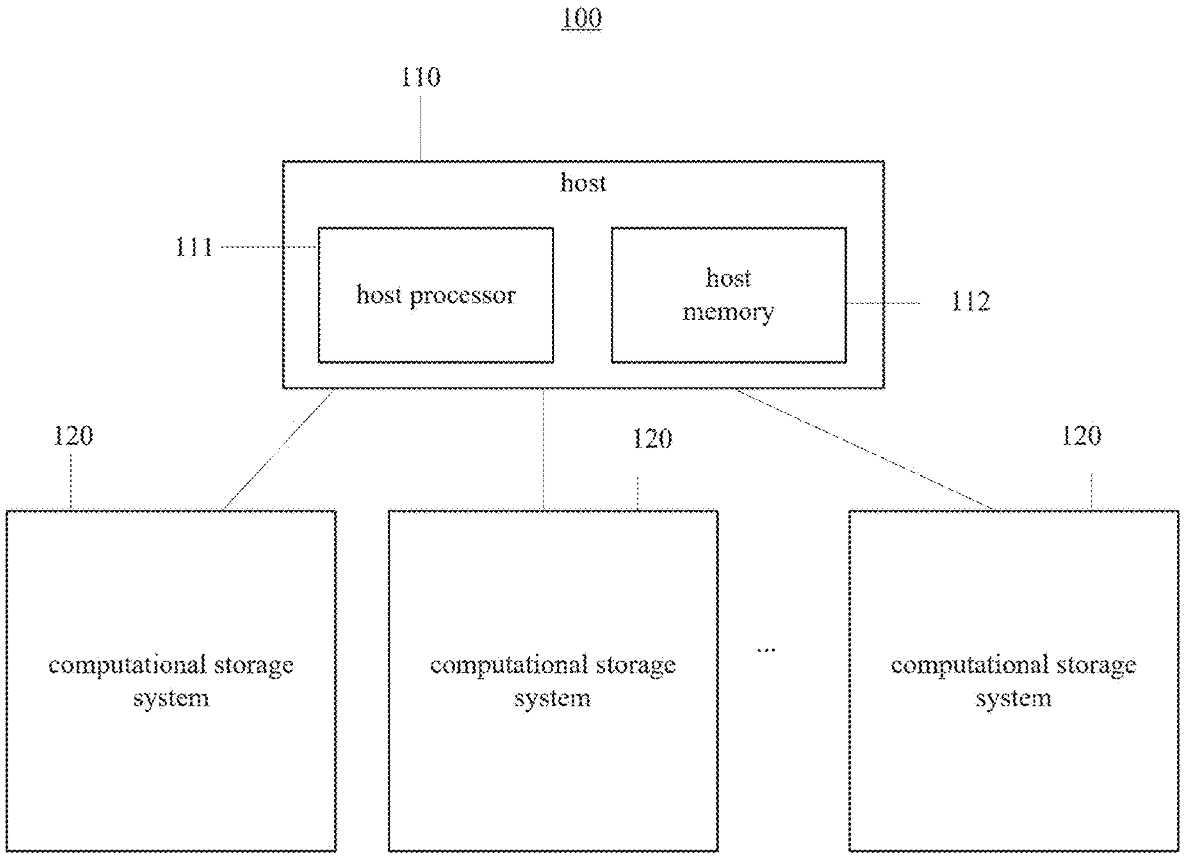
FIG. 1 is a first schematic structural diagram of an electronic system, according to an example of the present disclosure.

Exemplary implementations disclosed in the present disclosure will be described in more detail below with reference to the accompanying drawings. Although exemplary implementations of the present disclosure are shown in the accompanying drawings, it is to be understood that the present disclosure may be implemented in various forms and should not be limited to the implementations set forth herein. Rather, these implementations are provided so that the present disclosure can be more thoroughly understood and the scope disclosed in the present disclosure can be fully conveyed to those skilled in the art.

In the following description, numerous details are given in order to provide a more thorough understanding of the present disclosure. However, it will be apparent to one skilled in the art that the present disclosure may be practiced without one or more of these details. In other examples, in order to avoid confusion with the present disclosure, some technical features known in the art are not described; that is, not all features of the actual examples are described here, and well-known functions and structures are not described in detail.

In the drawings, like reference numerals refer to like elements throughout.

It should be understood that spatial relation terms such as “beneath,” “below,” “lower,” “under”, “above,” “upper,” etc., may be used herein for ease of description to describe the relationship between one element or feature and other elements or features shown in the figures. It should be appreciated that in addition to the orientations shown in the figures, the spatial relation term intent to also include different orientations of the devices in use and operation. For example, if the devices in the figures are flipped, then described as "below" or "under" or "beneath" other elements or features will be oriented "on" other elements or features. Thus, the exemplary terms "below" and "under" may include both upper and lower orientations. The devices may be additionally oriented (rotated 90 degrees or other orientations) and the spatial description terminology used herein is interpreted accordingly.

A term used herein is for the purpose of describing a specific examples only and is not to be considered as limitation of the present disclosure. As used herein, the singular forms "a", "an" and "said/the" are intended to include the plural forms as well, unless the context clearly dictates otherwise. It should also be understood that the terms "consists of" and/or "comprising", when used in this description, identify the presence of stated features, integers, steps, operations, elements and/or parts, but do not exclude the presence or addition of one or more other features, integers, steps, operations, elements, parts and/or groups. As used herein, the term "and/or" includes any and all combinations of the associated listed items.

Figure 2:
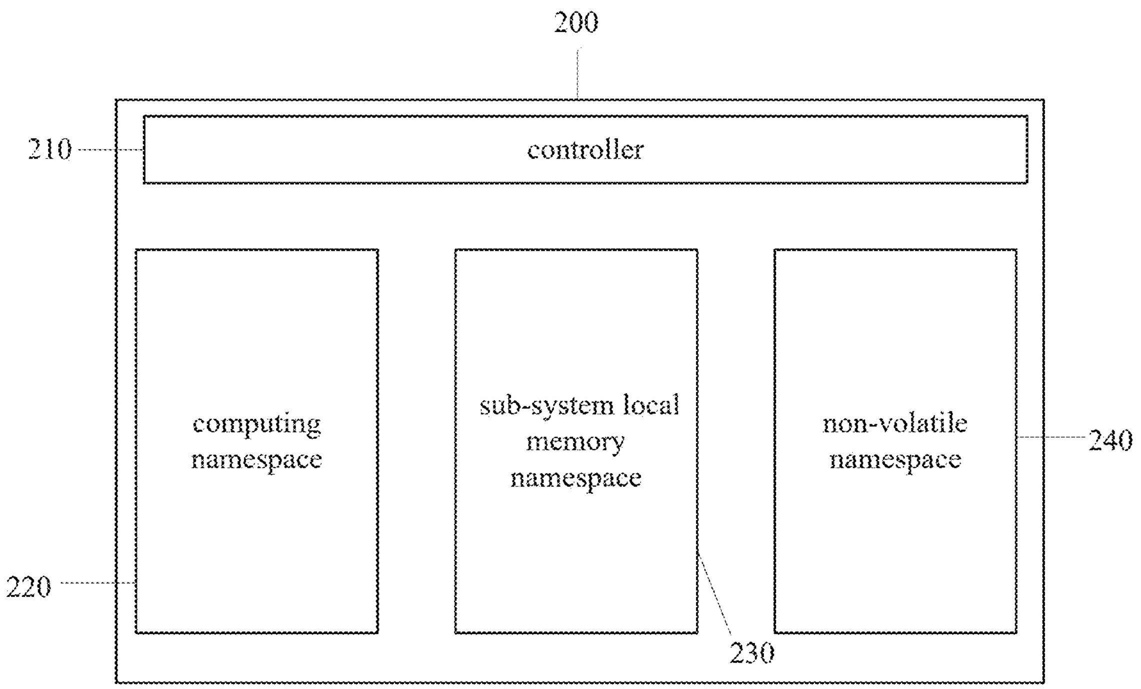
FIG. 2 is a first schematic structural diagram of a computational storage system according to an example of the present disclosure.

FIG. 1 is a schematic structural diagram of an electronic system, according to an example of the present disclosure. FIG. 2 is a schematic structural diagram of a computational storage system, according to an example of the present disclosure.

Referring to FIG. 1, an electronic system 100 may include a host 110 and at least one computational storage system 120. The host 110 may include a host processor 111 and a host memory 112. The host processor 111 may control the overall operation of the host 110. The host processor 111 may be implemented as at least one of various processing units (e.g., a central processing unit (CPU), an application processor (AP), a graphics processing unit (GPU), a neural processor unit (NPU), a field programmable gate array (FPGA), and/or a microprocessor). In some examples, the host processor 111 may be implemented as a system on chip (SoC). The host memory 112 may store data, instructions, and programs needed for the operation of the host processor 111. The host memory 112 may be a volatile memory. Volatile memory may include, but is not limited to, random access memory (RAM), dynamic random access memory (DRAM), static random access memory (SRAM), synchronous dynamic random access memory (SDRAM), double data rate synchronous dynamic random access memory (DDR SDRAM).

The computational storage system 120 may be a semiconductor device that provides computing services and data storage services. The computational storage system 120 may be used as both a data storage in the electronic system 100 and a computing device for executing programs. In some examples, for example, the computational storage system 120 may be implemented as part of a data center or artificial intelligence training data device.

In some examples, host 110 and computational storage system 120 may be physically connected through an interface and comply with corresponding peripheral component interconnect express (PCIe)/non-volatile memory express (NVMe) protocol communications. For example, the host 110 and the computational storage system 120 may be connected through a network link, for example, based on an NVMe-OF protocol connection. For example, the host 110 and the computational storage system 120 may also be connected through a compute express link (CXL) interface, and the host 110 may control the operation of the computational storage system 120 via a CXL interface. The computational storage system 120 is configured to comply with the computational storage protocol of NVMe. The CXL interface may include CXL.io, CXL.cache, and CXL.mem as sub-protocols. The host 110 may load a predetermined program to the computational storage system 120 for processing. The host 110 may load various types of programs, such as at least one of applications, kernels, or computations, to the computational storage system 120. The program may include, for example, at least one of an encryption program, a compression program, an image recognition program, a filter program, or an artificial intelligence program.

Referring to FIG. 2, in some examples, the computational storage system 200 may include a controller 210, one or more sub-system local memory (SLM) namespaces (NS) (SLM NS) 230, one or more non-volatile memory (NVM) namespaces (NS) (NVM NS) 240, and one or more computing namespaces (CNS) 220. The computational storage system 200 may correspond to one of the plurality of computational storage systems 120 shown in FIG. 1. The sub-system local memory namespace 230 may be a namespace implemented by volatile memory that is closer to the computing processing components of the computing namespace 220 relative to the namespace implemented by the non-volatile memory. Non-volatile namespace 240 may be a namespace implemented by a non-volatile memory.

In some examples, the computational storage system 200 may use a non-volatile memory express protocol as a memory protocol, and the controller 210 may be an NVMe controller. The controller 210 may perform at least one of storing input data/output data in a process of executing a program into the sub-system local memory namespace 230 or reading input data/output data stored in the sub-system local memory namespace 230 in response to an input/output (I/O) request from the host.

In some examples, the controller 210 may execute various operations for controlling the non-volatile namespace 240 or other non-volatile memory. For example, various operations may include at least one of address-mapping operations, wear-leveling operations, or garbage-collection operations. The address-mapping operation may be a translation operation between a logical address managed by the host or controller and a physical address of the non-volatile namespace 240. Wear leveling may be an operation of equalizing the use frequency or number of multiple memory blocks included in the non-volatile namespace 240. The garbage-collection operation may be an operation of copying valid data from the source block of the non-volatile namespace 240 to the target block and then erasing the source block to ensure the available blocks or free blocks in the non-volatile namespace 240.

In some examples, the computing namespace 220 may be used as an abstraction that represents one or more computing engines for executing programs. The computing engine resources may be composed of one or more of a CPU, an FPGA, a GPU, an ASIC, or the like. For example, the computing namespace may include a CPU core and an FPGA. The computing engine resource may be part of the controller 210, or may be part independent of the controller 210. The computing engine may execute a program preloaded from the host. In some examples, the program may be stored in a program slot. A program slot may be formed in the computing engine or may be allocated in separate memory. In some examples, a program slot in which a program is stored may be within the computing namespace 220 or may form a computing namespace 220, which is an entity capable of executing programs. The computing namespace 220 may be, for example, an entity in an NVMe sub-system. The computing namespace 220 can access the sub-system local memory namespace 230. In some examples, the computational storage system 200 may include one or more computing namespaces 220. If the computational storage system 200 includes multiple computing namespaces 220, the host may load a plurality of programs to multiple computing namespaces 220 (e.g., in a one-to-one relationship), respectively. Thus, each loaded program may be managed in a respective computing namespace 220, and the present disclosure is not limited thereto.

In some examples, the controller 210 may perform at least one of copying the data stored in the non-volatile namespace 240 to the sub-system local memory namespace 230 or copying the data stored in the sub-system local memory namespace 230 to the non-volatile namespace 240. That is, the controller 210 may control the data migration of the non-volatile namespace 240 and the sub-system local memory namespace 230 according to the need for program processing of the computing namespace 220.

The sub-system local memory namespace 230 may store input data to be used by programs to be executed or may store results (output data) obtained from executing programs. In some examples, the sub-system local memory namespace 230 may also be accessed by the controller 210. The sub-system local memory namespace 230 may be implemented, for example, as DRAM.

In some examples, the controller 210 may also include a first control portion (not shown) that controls the sub-system local memory namespace 230, such as a cache controller. In some examples, the first control portion may be disposed as a chip separate from the controller 210. In some other examples, the first control portion may be disposed as an internal component of the controller 210.

Non-volatile namespace 240 may store input data/output data in a process of executing a program. Non-volatile namespace 240 may include, for example, flash memory such as NAND flash memory. In another example, the non-volatile namespace 240 may include, for example, phase change memory, resistive memory, magnetoresistive memory, ferroelectric memory, or polymer memory. In some examples, the computational storage system 200 may also include a second control portion, such as a flash controller, that controls or is configured to control the non-volatile namespace 240, which may be included in the controller 210.

In the examples of the present disclosure, the computing processing component in the computational storage system includes a computing engine resource that is abstracted into one or more computing namespaces for use by a user. A RAM inside the computing processing component in the computational storage system, a common RAM inside the computational storage system, and a RAM inside the controller may all be abstracted into a sub-system local namespace to be provided to the user for use. For a user, these computing namespaces and the sub-system local memory namespaces are in a parallel relationship. In some implementations, the user may be informed that a certain sub-system local memory namespace is used by a certain computing namespace (because of a physical dependency) according to an internal specific physical implementation.

Figure 3:
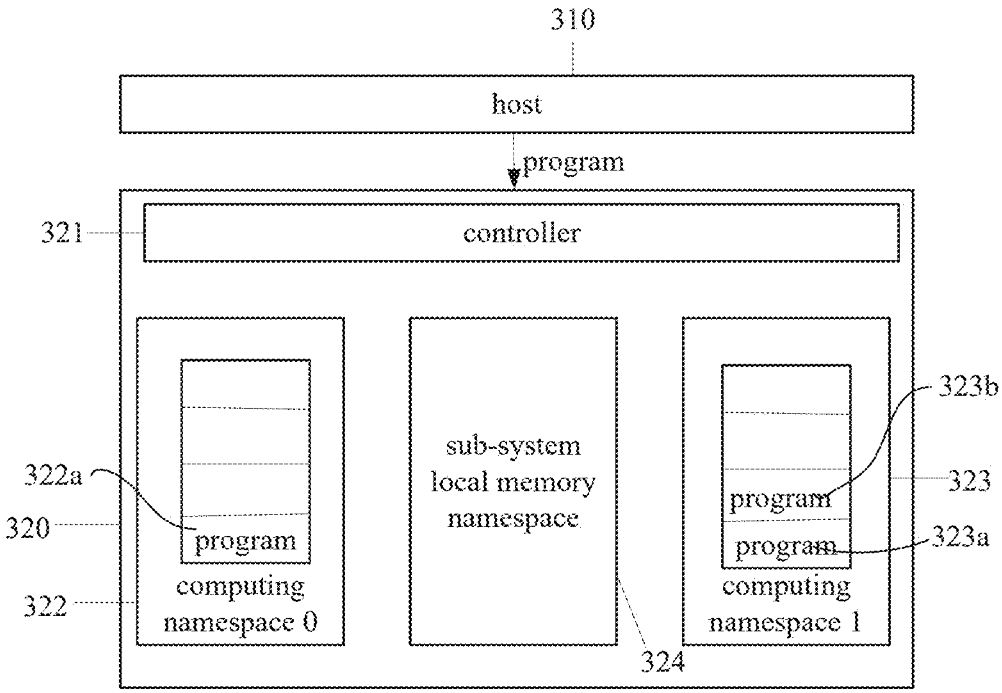
FIG. 3 is a schematic diagram of an example of loading a program in an electronic system according to an example of the present disclosure.

FIG. 3 is a schematic diagram of an example of loading a program in an electronic system, according to an example of the present disclosure.

Referring to FIG. 3, host 310 may load a program to computational storage system 320. In FIG. 3, the computational storage system 320 is shown to include a computing namespace 322 and a computing namespace 323 (e.g., computing namespaces 0 and 1), but the number of computing namespaces is not limited thereto.

In some examples, computing namespace 322 and computing namespace 323 may support at least one of device-defined programs or downloadable programs. The device-defined program may be, for example, a fixed program provided by a manufacturer; and the downloadable program may be a program loaded into the computing namespace 322 and the computing namespace 323 by the host 310. For example, the device-defined program 323*a* may be disposed in the computing namespace 323.

In some examples, the controller 321 of the computational storage system 320 may receive the programs 322*a* and 323*b* transmitted from the host 310 and store in the computational storage system 320. In response to program execution commands from the host 310, the computing engine of the computing namespace may execute at least one of programs 322*a*, 323*a*, or 323*b* in the computing namespace 322 and computing namespace 323 using input data stored in the sub-system local memory namespace 324, which may be respective input parameters required for program execution, and/or the like.

Figure 4:
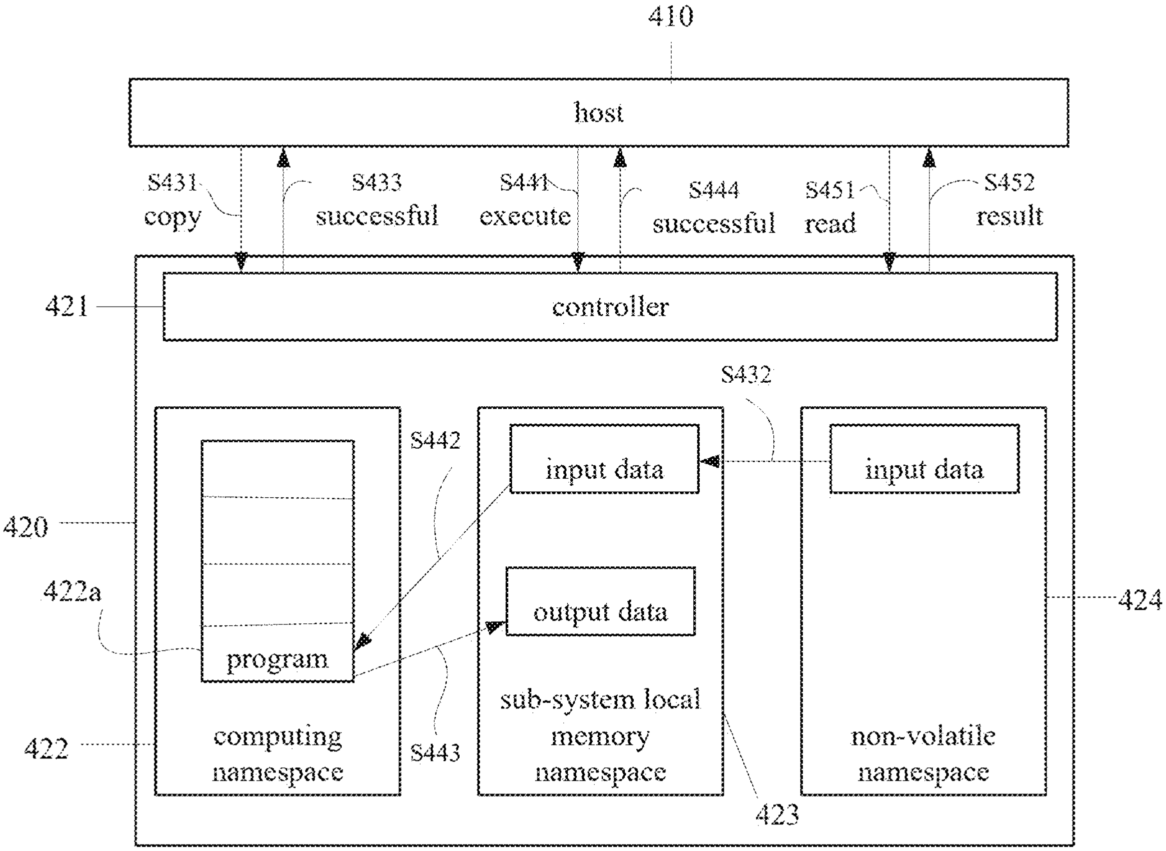
FIG. 4 is a schematic diagram of an example of program execution in an electronic system according to an example of the present disclosure.

FIG. 4 is a schematic diagram of an example of program execution in an electronic system, according to an example of the present disclosure. In FIG. 4, assume that program 422*a* is loaded into computing namespace 422 of computational storage system 420.

Referring to FIG. 4, at operation S431, the host 410 may send a data copy command to the controller 421 of the computational storage system 420. At operation S432, in response to the data copy command, input data stored in non-volatile namespace 424 (e.g., non-volatile memory device) may be copied to sub-system local memory namespace 423. In some examples, the controller 421 may control the non-volatile namespace 424 and the sub-system local memory namespace 423 in response to the data copy command to transfer input data from the non-volatile namespace 424 to the sub-system local memory namespace 423.

It should be noted that FIG. 4 is only an example, and is not intended to limit the transmission path of the input data and the output data in the examples of the present disclosure. In some examples, the host 410 may directly write the input data into the sub-system local memory namespace 423, and the output data obtained after the input data is processed by the program is stored into the sub-system local memory namespace 423. The host 410 may directly obtain the output data from the sub-system local memory namespace 423. That is, the non-volatile namespace 424 may not be involved in the storage of input data and the storage of output data. In some other examples, the non-volatile namespace 424 may also be involved in the storage of input data and the storage of output data, the host 410 may write the input data into the non-volatile namespace 424. The non-volatile namespace 424 copies the input data to the sub-system local memory namespace 423. The output data obtained after the input data is processed by the program is stored in the sub-system local memory namespace 423. The output data in the sub-system local memory namespace 423 is copied into the non-volatile namespace 424. The host may obtain the output data from the non-volatile namespace 424.

In still other examples, the non-volatile namespace 424 may only be involved in one of the storage of input data and the storage of output data. For example, the host 410 may directly write the input data into the sub-system local memory namespace 423. The output data obtained after the input data is processed by the program is stored into the sub-system local memory namespace 423. The output data in the sub-system local memory namespace 423 is copied into the non-volatile namespace 424, and the host 410 may obtain the output data from the non-volatile namespace 424.

In some examples, the host 410 may write the input data into the non-volatile namespace 424. The input data in the non-volatile namespace 424 is copied to the sub-system local memory namespace 423. The output data obtained after the input data is processed by the program is stored in the sub-system local memory namespace 423. The host 410 may directly obtain the output data from the sub-system local memory namespace 423.

After copying data from NVM namespace 424 to the sub-system local memory namespace 423, at operation S433, controller 421 may send a read success message to host 410.

To execute the program, at operation S441, the host 410 may send program execution commands to the computational storage system 420 to execute the program 422*a* in the computing namespace 422. In some examples, the controller 421 may receive program execution commands from the host 410. At operation S442, in response to the program execution command, the computing engine in the computing namespace 422 may execute the program 422*a* in the computing namespace 422 using the input data stored in the sub-system local memory namespace 423. At operation S443, the computing namespace may store the execution result (output data) of the program 422*a* into the sub-system local memory namespace 423. After the execution of the program 422*a* in the computing namespace 422 is completed, at operation S444, the controller 421 may send a message indicating successful execution of the program to the host 410.

In some examples, at operation S451, the host 410 may send a read command indicating to read output data from the sub-system local memory namespace 423 to the computational storage system 420. At operation S452, the controller 421 may read the output data (e.g., the execution result of the program 422*a*) from the sub-system local memory namespace 423 and transmit the data to the host 410.

In some examples, after the execution of the program 422*a* is completed, the output data may be flushed down from the sub-system local memory namespace 423 to the non-volatile namespace 424.

The electronic system may execute programs on the computational storage system 420 by performing the operations described above. Further, if requested by the host 410, the electronic system may provide execution results of the program from the computational storage system 420 to the host 410.

Figure 5:
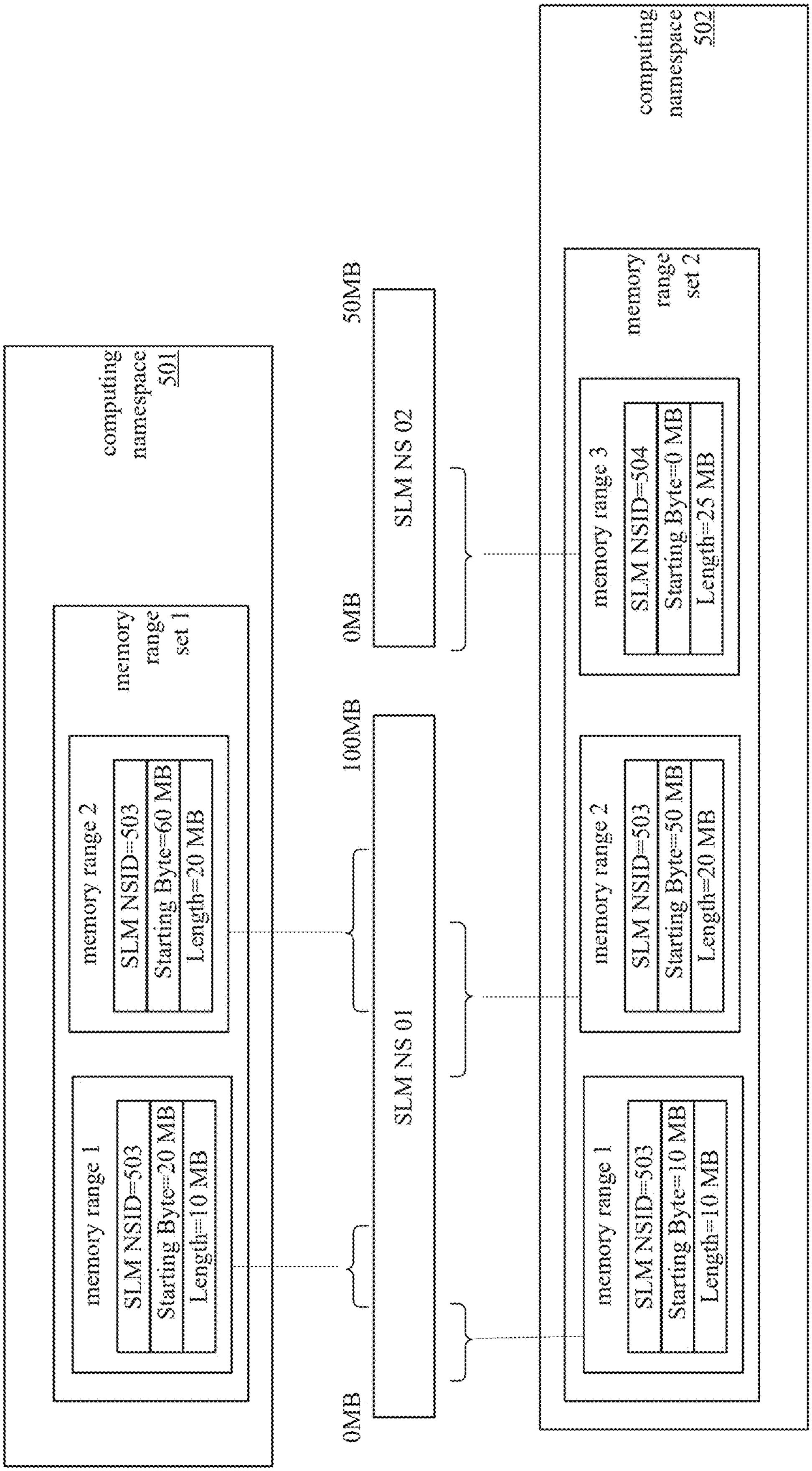
FIG. 5 is a schematic diagram of a memory range and a memory range set according to an example of the present disclosure.

In some examples, the controller 421 configures a respective storage area in the memory of the sub-system local memory namespace 423 for storing the input data/output data in the process of executing a program in response to a command of the host. In some examples, the controller may configure a respective storage area by creating a memory range, where one memory range (MR) may define one corresponding storage area, the memory range may be represented by a sub-system local memory namespaces identity (SLM NS ID), a starting byte of the storage area in the local memory namespace, and a length, and each memory range may specify a range in which the sub-system local memory namespace may be accessed. A set of memory ranges constitutes a memory range set (MRS). The memory range set may be stored in a computing namespace, and each execution of the program may be limited to accessing a range other than the range specified by the memory range set in the program name. As shown in FIG. 5, the memory range 1 and the memory range 2 in the computing namespace 501 constitute a memory range set 1; and the memory range 1, the memory range 2, and the memory range 3 in the computing namespace 502 constitute a memory range set 2. Each memory range includes information related to a sub-system local memory namespaces identity (SLM NS ID). A starting byte of the storage area in the local memory namespace, and a length, and one area in the sub-system local memory namespace corresponding to the memory range may be obtained by the information included in the memory range. It should be noted that an example in which the memory range set is stored in the computing namespace is used as an example for description in FIG. 5, but the examples of the present disclosure are not limited thereto, and the memory range set may also be stored in other memories having a storage function of the computational storage system.

The complexity of the command to execute the program is the diversity of the function of the computing program, the number of input data/output data of the computing program of each function is different, and the format of the command to execute the program is different. The NVMe Association defines program unique identifier registry and the programs of different functions correspond to different program unique identifiers (PUIDs). The program unique identifier is configured to define the association information of a respective address of the input data in the process of executing the program in the local memory namespace and define the association information of a respective address of the output data in the process of executing the program in the local memory namespace.

The way of obtaining the respective address of the input data in the process of executing the program in the local memory namespace and the respective address of the output data in the process of executing the program in the local memory namespace by the PUID enables the host and the computational storage system to agree on the execution of the program. However, this technique lacks flexibility, where the respective addresses of the input data and the output data in the process of executing the program in the local memory namespace need to be defined according to the PUID, the NVMe Association or the vendor needs apply for the PUID in the process and then add it to the PUID registry. For a newly compiled program, the period that can be executed by the computational storage system is relatively long.

Figure 6:
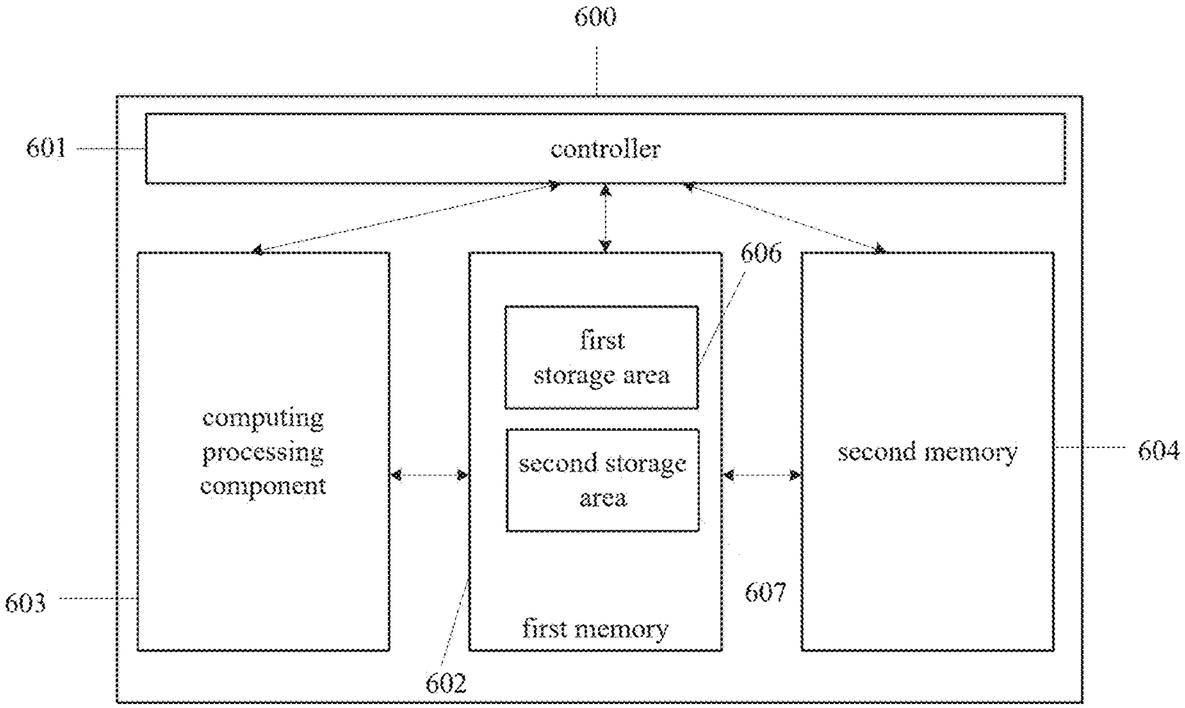
FIG. 6 is a second schematic structural diagram of a computational storage system according to an example of the present disclosure.

The present disclosure provides a computational storage system, as shown in FIG. 6, the computational storage system 600 includes a controller 601, a first memory 602 coupled to the controller 601, and a computing processing component 603 configured to execute a program. The controller 601 is configured to receive a command sent by a host coupled to the computational storage system 600, where the command instructs the computing processing component 603 to execute a program, and the command defines association information of a respective address of at least one of input data or output data in a process of executing the program in the first memory 602. The controller 601 is configured to obtain the respective address of at least one of input data or output data in the process of executing the program in the first memory 602 from the host according to the association information.

In some examples, as shown in FIG. 6, the first memory 602 includes a first storage area 606 configured for input data in the process of executing the program by the computing processing component 603, and a second storage area 607 configured for output data in the process of executing the program by the computing processing component 603.

In the examples of the present disclosure, the address of the input data in the process of executing the program in the first storage area 606 and the address of the output data in the process of executing the program in the second storage area 607 are stored in the host. The command sent by the host directly defines the association information of the respective address of at least one of the input data or the output data in the process of executing the program in the first memory 602. Here, the association information of the respective address of at least one of the input data or the output data in the process of executing the program in the first memory 602 may be exemplarily understood as the respective address of at least one of the input data or the output data in the process of executing the program in the first memory 602 corresponds to the address stored in the buffer of the host. By using the information stored in the buffer corresponding to the address, the respective address of at least one of the input data or the output data in the first memory 602 may be obtained.

In some examples, the command sent by the host may be a command to instruct the compute processing component 603 to execute a program.

In some examples, the first memory 602 is a volatile memory, including but not limited to a random access memory (RAM), a dynamic random access memory (DRAM), a static random access memory (SRAM), a synchronous dynamic random access memory (SDRAM), a double data rate synchronous dynamic random access memory (DDR SDRAM). The computing processing component 603 has a computing function, including but not limited to a computing engine, and the computing engine resource may be composed of one or more of a CPU, an FPGA, a GPU, and the like. The computing processing component 603 may be a part of the controller 601 or a part independent of the controller 601.

In the examples of the present disclosure, the controller 601 receives a command to instruct the computing processing component 603 to execute a program sent by the host. The command defines the association information of the respective address of at least one of the input data or the output data in the process of executing the program in the first memory 602. The controller 601, according to the respective address of at least one of the input data or the output data in the process of executing the program in the first memory 602 obtained by parsing the association information, obtains the respective address of at least one of the input data or the output data in the process of executing the program in the first memory 602 from the host, so that the program can execute normally.

That is, in the examples of the present disclosure, the association information of the respective address of at least one of the input data or the output data in the process of executing the program in the first memory 602 can be directly defined only by the command sent by the host without depending on the program unique identifier, so that the respective address of at least one of the input data or the output data in the process of executing the program in the first memory 602 is obtained from the host. In this way, the program can execute normally even when it does not apply or has applied but has not obtained the corresponding program unique identifier. Hence, the way in which the controller 601 obtains the respective address of at least one of the input data or the output data in the process of executing the program in the first memory 602 is more flexible.

The examples of the present disclosure provide a plurality of ways in which the command defines the association information of a respective address of at least one of the input data or the output data in the process of executing the program in the first memory 602.

In some examples, the command carries first pointer information and at least one of a first parameter or a second parameter. The first parameter includes the number of input data in the process of executing the program. The second parameter includes the number of output data in the process of executing the program. The first pointer information points to a first area in a buffer in the host. A respective address of each input data in the first memory 602 and a respective address of each output data in the first memory 602 are stored in the first area. A respective address of each input data in the process of executing the program in the first memory 602 and a respective address of each output data in the process of executing the program in the first memory 602 are sequentially stored in the first area according to a first preset order.

In some examples, the buffer in the host is a volatile memory including, but not limited to, random access memory, dynamic random access memory, static random access memory, synchronous dynamic random access memory, double data rate synchronous dynamic random access memory.

In the foregoing example, the command carries first pointer information. The first pointer information points to a first area in a buffer in the host. A respective address of each input data in the process of executing the program in the first memory 602 and a respective address of each output data in the process of executing the program in the first memory 602 are stored in the first area. A respective address of each input data in the process of executing the program in the first memory 602 and a respective address of each output data in the process of executing the program in the first memory 602 are sequentially stored in the first area according to a first preset order. The first parameter carried in the command sent by the host includes the number of input data in the process of executing the program, and the second parameter carried in the command sent by the host includes the number of output data in the process of executing the program.

As shown below in Table 1, the number of input data in the process of executing the program included in the first parameter may be recorded with information of fixed p bytes, and the first p bytes in the first parameter are used to store the number of input data in the process of executing the program. As shown below in Table 2, the number of output data in the process of executing the program included in the second parameter may be recorded with information of fixed q bytes, and the first q bytes in the second parameter are used to store the number of output data in the process of executing the program. The specific values of p and q may be respectively determined according to the size of the information about the number of input data and the number of output data. In some examples, p and q are equal, and the bytes configured for the first parameter and the second parameter are m bytes in total. The remaining bytes configured for the first parameter and the second parameter may be reserved for subsequent optimization.

TABLE 1

| Format of the First Parameter | |
|---|---|
| Byte | Description |
| (p − 1):00 | Number of input parameters |
| (m − 1):p | Reserved for subsequent optimization |

TABLE 2

| Format of the Second Parameter | |
|---|---|
| Byte | Description |
| (q − 1):00 | Number of output parameters |
| (m − 1):q | Reserved for subsequent optimization |

In some examples, the controller 601 is configured to obtain at least one of the respective address of each input data in the process of executing the program in the first memory 602 or the respective address of each output data in the process of executing the program in the first memory 602 from the buffer of the host according to the first pointer information and at least one of the first parameter or the second parameter.

In the examples of the present disclosure, when the respective address of each input data in the process of executing the program in the first memory 602 and the respective address of each output data in the process of executing the program in the first memory 602 are stored in the first area sequentially according to a first preset order, the controller 601 may determine which of the addresses stored in the first area of the host are the respective address of the input data in the first storage area and the respective address of the output data in the second storage area according to the first pointer information and at least one of the first parameter or the second parameter carried in the command.

In some examples, the controller 601 is configured to obtain at least one of the respective address of input data in the process of executing the program in the first memory 602 or the respective address of output data in the process of executing the program in the first memory 602 from the host according to a capacity size of the buffer occupied by each of the respective addresses of each input data and each output data in the first memory 602, information about the first preset order, the number of input data, and the number of output data.

In some examples, a capacity size of the buffer occupied by a respective address of each input data in the first memory 602 is the same and is a first value, a capacity size of the buffer occupied by a respective address of each output data in the first memory 602 is the same and is a second value, and the first value is equal to the second value.

It may be understood that, in the solutions provided in the examples of the present disclosure, a capacity size of the buffer occupied by each of respective addresses of each input data in the first memory 602 is equal, and a capacity size of the buffer occupied by each of respective addresses of each output data in the first memory 602 is the same, and the first value is equal to the second value, which reduces the difficulty of parsing by the controller 601. In this way, the controller 601 parses to obtain at least one of the respective address of input data in the process of executing the program in the first memory 602 or the respective address of output data in the process of executing the program in the first memory 602 faster according to a capacity size of the buffer occupied by each of the respective addresses of each input data and each output data in the first memory 602, information about the first preset order, the number of input data, and the number of output data.

In some examples, the first preset order may be that the respective address of the input data in the first memory 602 and the respective address of the output data in the first memory 602 are alternately stored in the first area. In the manner of alternately storing, the first area may start with storing the respective address of the input data in the first memory 602, or the first area may start with storing the respective address of the output data in the first memory 602.

In some examples, the first preset order includes an order in which the respective address of the input data in the first memory 602 is stored first and the respective address of the output data in the first memory 602 is stored later. In some examples, the first preset order includes an order in which the respective address of the output data in the first memory 602 is stored first and the respective address of the input data in the first memory 602 is stored later.

It may be understood that with respect to the above-mentioned first preset order, the respective address of the input data in the first memory 602 is stored first and the respective address of the output data in the first memory 602 is stored later, in some examples. In some other examples, with respect to the above-mentioned first preset order, the respective address of the output data in the first memory 602 is stored first and the respective address of the input data in the first memory 602 is stored later, which further reduces the difficulty of parsing by the controller 601. In this way, the controller 601 parses to obtain at least one of the respective address of input data in the process of executing the program in the first memory 602 or the respective address of output data in the process of executing the program in the first memory 602.

In some examples, the command may only carry one of the first parameter and the second parameter; and when the command carries only one of the first parameter and the second parameter, if the first preset order is reasonably set, a respective address of the input data in the first memory and a respective address of the output data in the first memory can still be obtained. For example, the first preset order herein may be an order in which the respective address of the input data in the first memory is stored first and the respective address of the output data in the first memory is stored later; or the first preset order may be an order in which the respective address of the output data in the first memory is stored first and the respective address of the input data in the first memory is stored later.

In some examples, a respective address of each input data/output data in the first memory 602 includes information about the first memory 602 to which an area storing respective input data/output data belongs, a size of the input data/output data, and a starting address of the input data/output data in the first memory 602.

It may be understood that the specific location of the input data/output data in the first memory 602 may be defined by storing the information about the first memory 602 to which an area storing respective input data/output data belongs, a size of the input data/output data, and a starting address of the input data/output data in the first memory 602.

The following takes the first preset being an order in which the respective address of the input data in the first memory 602 is stored first and the respective address of the output data in the first memory 602 is stored later as an example, to illustrate how the controller 601 obtains the respective address of input data in the process of executing the program in the first memory 602 and the respective address of output data in the process of executing the program in the first memory 602.

As shown below in Table 3, each input data records a position of the input data in the first memory 602 by using information of a fixed n bytes, and the n bytes sequentially record an identification number of the first memory 602 to which the area storing the respective input data belongs, a size of the input data, and a starting address of the input data in the first memory 602.

Each output data also records a position of the output data in the first memory 602 by using information of a fixed n bytes, and the n bytes sequentially record an identification number of the first memory 602 to which the area storing the respective output data belongs, a size of the output data, and a starting address of the output data in the first memory 602.

area storing the second output data belongs; h: (g+1) records the size of the second output data; and (4n−1): (h+1) records the starting address of the second output data in the first memory 602.

The respective addresses of the input data and the output data in the process of executing the program in the first memory 602 are all stored in the first area of the buffer of the host, and the capacity size of the first area herein is (4n) bytes. Here, n may be set according to the capacity size required to record the respective address. Here, b is greater than (a+1), (n−1) is greater than (b+1), c is greater than n, d is greater than (c+1), (2n−1) is greater than (d+1), e is greater than (2n), f is greater than (e+1), (3n−1) is greater than (f+1), g is greater than (3n), h is greater than (g+1), and (4n−1) is greater than (h+1).

TABLE 3

Format of information stored in the first area

| Byte | Field | Description |
|---|---|---|
| a:00 | The identification number of a first memory to which an area storing the first input data belongs | The respective address of the first input data in the first memory |
| b:(a + 1) | The size of the first input data | |
| (n − 1):(b + 1) | The starting address of the first input data in the first memory | |
| c:n | The identification number of a first memory to which an area storing a second input data belongs | The respective address of the second input data in the first memory |
| d:(c + 1) | The size of the second input data | |
| (2n − 1):(d + 1) | The starting address of the second input data in the first memory | |
| e:(2n) | The identification number of a first memory to which an area storing the first output data belongs | The respective address of the first output data in the first memory |
| f:(e + 1) | The size of the first output data | |
| (3n − 1):(f + 1) | The starting address of the first output data in the first memory | |
| g:(3n) | The identification number of a first memory to which an area storing a second output data belongs | The respective address of the second output data in the first memory |
| h:(g + 1) | The size of the second output data | |
| (4n − 1):(h + 1) | The starting address of the second output data in the first memory | |

Assuming 2 input data and 2 output data are involved in the program as an example, (n−1): 00 stores the respective address of the first input data in the first memory 602; a: 00 records the identification number of the first memory 602 to which the area storing the first input data belongs; b: (a+1) records the size of the first input data; (n−1): (b+1) records the starting address of the first input data in the first memory 602.

(2n−1): n stores the respective address of the second input data in the first memory 602; c: n records the identification number of the first memory 602 to which the area storing the second input data belongs; d: (c+1) records the size of the second input data; and (2n−1): (d+1) records the starting address of the second input data in the first memory 602.

(3n−1): (2n) stores the respective address of the first output data in the first memory 602; e: 2n records the identification number of the first memory 602 to which the area storing the first output data belongs; f: (e+1) records the size of the first output data; and (3n−1): (f+1) records the starting address of the first output data in the first memory 602.

(4n−1): (3n) stores the respective address of the second output data in the first memory 602; g: **3*n* records the identification number of the first memory 602** to which the area storing the second output data belongs.

In some examples, the information in Table 3 may be included directly in the sent command. In some other examples, the information in Table 3 may also be stored in a buffer in the host, the sent command carries pointer information, and the pointer information points to a segment of the buffer in the host in which the Table 3 is stored.

In the above example, the first preset order is an order in which the respective address of the input data in the first memory 602 is stored first and the respective address of the output data in the first memory 602 is stored later. A capacity size of the buffer occupied by each of the respective address of each input data and each output data in the first memory 602 is n bytes, the number of the input data is 2. The number of the output data is 2.

The controller 601 may parse to obtain the following in information of the 4n bytes stored in the first area of the buffer of the host according to the following. The 0th byte to the (n−1)th byte store the respective address of the first input data in the first memory 602. The nth byte to the (2n−1)th byte store the respective address of the second input data in the first memory 602. The (2n)th byte to the (3n−1)th byte store the respective address of the first output data in the first memory 602. The (3n)th byte to the (4n−1)th byte store the respective address of the second output data in the first memory 602. In this way, the controller 601 can obtain at least one of the respective address of each input data in the process of executing the program in the first memory 602 or the respective address of each output data in the process of executing the program in the first memory 602 from the first area of the buffer of the host according to the parsed information.

In the above example, the number of input data and the number of output data are carried in the command to execute the program, the respective address in which the input data and the output data are stored in the first memory are transferred in the buffer of the host, and the respective address of each input data/output data in the first memory is fixed in length. In this way, when parsing the command to execute the program, the controller can find the corresponding input data and the corresponding output data without knowing the program unique identifier, in order to execute the program normally.

In some examples, the command carries second pointer information; the second pointer information points to a second area in the buffer in the host; the second area stores the number of input data, a respective address of each input data in the first memory 602, the number of output data, and a respective address of each output data in the first memory 602, and the number of input data in the process of executing the program, a respective address of each input data in the first memory 602, the number of output data in the process of executing the program, and a respective address of each output data in the first memory 602 are sequentially stored into the second area according to a second preset order.

It may be understood that, in the foregoing example, the command sent by the host may not additionally carry the first parameter and the second parameter, and the number of input data, the number of output data, the respective address of each input data in the first memory 602, and the respective address of each output data in the first memory 602 may be stored together in the second area in the buffer of the host in the second preset order.

The second preset order herein includes one or more of the following: 1) the number of input data is stored in front, then the respective address of each input data in the first memory 602 is stored, then the number of the output data is stored, and the respective address of each output data in the first memory 602 is stored last; 2) the number of the output data is stored in front, then the respective address of each output data in the first memory 602 is stored, then the number of the input data is stored, and the respective address of each input data in the first memory 602 is stored last; 3) the number of the input data and the number of the output data are stored in front. It may be that the number of the input data is stored first and the number of the output data is stored later; or it may be that the number of the output data is stored first and the number of the input data is stored later. The respective address of each input data in the first memory 602 and the respective address of each output data in the first memory 602 are stored last. It may be that the respective address of each input data in the first memory 602 is stored first and the respective address of each output data in the first memory 602 is stored later; or it may be that the respective address of each output data in the first memory 602 is stored first and the respective address of each input data in the first memory 602 is stored later.

It should be noted that the second preset order listed above is merely an example, and is not intended to limit the specific setting of the second preset order in the examples of the present disclosure, and in addition to the above listed three manners, the second preset order may be other achievable setting manners.

In some examples, the controller 601 is configured to obtain at least one of the respective address of input data in the process of executing the program in the first memory 602 or the respective address of output data in the process of executing the program in the first memory 602 from the host according to capacity sizes of the buffer occupied by each of the number of input data, the respective address of each input data in the first memory 602, the number of output data, the respective address of each output data in the first memory 602, information about the second preset order, the number of input data, and the number of output data.

In some examples, a capacity size of the buffer occupied by a respective address of each input data in the first memory 602 is a first value, a capacity size of the buffer occupied by a respective address of each output data in the first memory 602 is a second value, a capacity size of the buffer occupied by the number of input data is a fifth value, and a capacity size of the buffer occupied by the number of output data is a sixth value.

In some examples, all of the first value, the second value, the fifth value, and the sixth value may not be equal in size. In some examples, the first value and the second value are equal in size, the fifth value and the sixth value are not equal in size, and the first value is not equal to the fifth value and the sixth value in size. In some examples, all of the first value, the second value, the fifth value, and the sixth value may be equal.

It may be understood that in the foregoing example, the controller 601 may obtain the respective address of input data in the process of executing the program in the first memory 602 and the respective address of output data in the process of executing the program in the first memory 602 from the host according to capacity sizes of the buffer occupied by each of the number of input data, the respective address of each input data in the first memory 602, the number of output data, and the respective address of each output data in the first memory 602, information about the second preset order, the number of input data, and the number of output data, so that the program can execute normally.

In some examples, the host is configured to determine at least one of the number of input data in the process of executing the program or the number of output data in the process of executing the program according to functional characteristics of the program.

It may be understood that the number of input data in the process of executing the program and the number of output data in the process of executing the program may be determined according to functional characteristics of the program, and the number of input data and the number of output data of the program having different functional characteristics may be different.

In some examples, the command carries at least one of third pointer information or fourth pointer information. The third pointer information points to a third area in the buffer in the host, the third area stores a respective address of each input data in the process of executing the program in the first memory 602. The fourth pointer information points to a fourth area in the buffer, and the fourth area stores a respective address of each output data in the process of executing the program in the first memory 602. In some examples, the controller 601 is configured to obtain the respective address of input data in the process of executing the program in the first memory 602 from the host according to the address stored in the third area. In some examples, the controller 601 is configured to obtain the respective address of output data in the process of executing the program in the first memory 602 from the host according to the address stored in the fourth area.

The controller 601 can parse to obtain the respective address of output data in the process of executing the program in the first memory 602 and the respective address of input data in the process of executing the program in the first memory 602 without depending on the number of input data and the number of output data.

In the solution provided in the foregoing examples, the number of input data and the number of output data are not involved. The command carries at least one of the third pointer information or the fourth pointer information. The third pointer information points to the third area in the buffer in the host, the third area stores the respective address of each input data in the process of executing the program in the first memory 602. The fourth pointer information points to the fourth area in the buffer. The fourth area stores the respective address of each output data in the process of executing the program in the first memory 602. In this way, the controller 601 may obtain the respective address of the input data in the process of executing the program in the first memory 602 from the third area according to the third pointer information, and obtain the respective address of the output data in the process of executing the program in the first memory 602 from the fourth area according to the fourth pointer information.

In some examples, the computing processing component 603 is configured to execute the program and read input data in a respective area of the first memory 602 according to a respective address of input data in the process of executing the program in the first memory 602. In some examples, the computing processing component 603 is configured to store output data obtained after the program has processed the input data into the respective area of the first memory 602 according to a respective address of output data in the process of executing the program in the first memory 602.

In the examples of the present disclosure, after the controller 601 obtains the respective address of the input data in the process of executing the program in the first memory 602, the controller 601 may notify the computing processing component 603 of the obtained respective address of the input data in the process of executing the program in the first memory 602. The computing processing component 603 obtains the input data from the area of the first memory 602 corresponding to the respective address and processes the input data. In this way, output data obtained after the program in the computing processing component 603 processes the input data is refreshed into the area of the first memory 602 corresponding to the respective address, so that the program executes normally.

In some examples, the command further carries a first identifier. In some examples, the controller 601 is configured to obtain, based on a value of the first identifier being a third value, a respective address of input data in the process of executing the program in the first memory 602 and a respective address of output data in the process of executing the program in the first memory 602 according to the association information of respective addresses of the input data and the output data in the process of executing the program in the first memory 602 defined by a program unique identifier carried in the command. In some examples, the controller 601 is configured to obtain, based on a value of the first identifier being a fourth value, a respective address of input data in the process of executing the program in the first memory 602 and a respective address of output data in the process of executing the program in the first memory 602 from the host according to the association information of respective addresses of the input data and the output data in the process of executing the program in the first memory 602 defined by the command.

In some examples, the electronic system may have the ability to obtain a respective address of input data in the process of executing the program in the first memory 602 and a respective address of output data in the process of executing the program in the first memory 602 by the association information of respective addresses of the input data and the output data in the process of executing the program in the first memory 602 defined by a program unique identifier carried in the command. In some examples, the electronic system may have the ability to obtain a respective address of input data in the process of executing the program in the first memory 602 and a respective address of output data in the process of executing the program in the first memory 602 from the host according to the association information of respective addresses of the input data and the output data in the process of executing the program in the first memory 602 defined by the command. The host may carry the first identifier in the sent command to instruct the controller 601 to use which of the two examples mentioned above to obtain a respective address of input data in the process of executing the program in the first memory 602 and a respective address of output data in the process of executing the program in the first memory 602. For example, the third value is one of “0” or “1”, and the fourth value is the other of “0” or “1”.

In some examples, when the value of the first identifier is the third value, the command further carries a program unique identifier. In some examples, when the value of the first identifier is the fourth value, the command does not carry the program unique identifier.

In some examples, the computing processing component 603 is configured to load the program to be executed.

In some examples, the program to be executed may not be loaded through the computing processing component 603, such as when a fixed program is provided by the manufacturer.

In some examples, as shown in FIG. 6, the computational storage system 600 further includes a second memory 604 coupled to the controller 601.

In some examples, the second memory 604 is a non-volatile memory, e.g., such as, flash memory, NAND flash memory, phase change memory, resistive memory, magnetoresistive memory, ferroelectric memory, polymer memory, etc. The second memory may be configured to store input data/output data in the process of executing the program.

In some examples, the controller 601 is configured to write input data in the process of executing the program stored in the second memory 604 into the first memory 602. In some examples, the controller 601 is configured to write output data in the process of executing the program stored in the first memory 602 into the second memory 604.

In some examples, the output data in the process of executing the program may not be written into the second memory 604, and the host directly reads the output data in the process of executing the program stored in the first memory 602.

Figure 7:
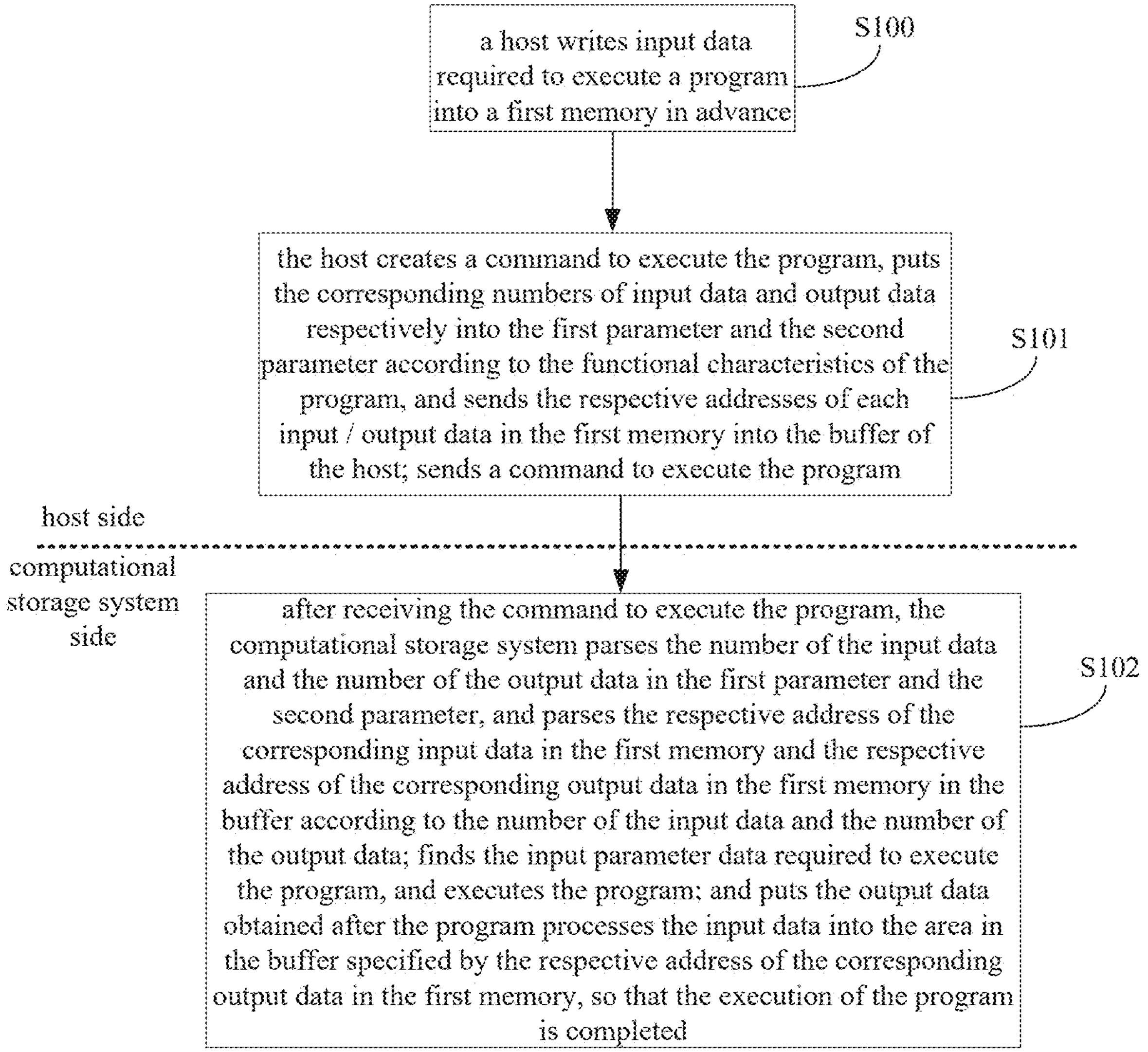
FIG. 7 is a schematic flowchart of a program execution process according to an example of the present disclosure.

FIG. 7 is a schematic flowchart of a program execution process according to an example of the present disclosure. As shown in FIG. 7, the method may include operations S100, S101, and S102.

At operation S100, a host writes input data required to execute a program into a first memory in advance.

At operation S101, the host creates a command to execute the program, puts the corresponding numbers of input data and output data respectively into the first parameter and the second parameter according to the functional characteristics of the program, sends the respective addresses of each input/output data in the first memory into the buffer of the host, and sends a command to execute the program.

At operation S102, after receiving the command to execute the program, the computational storage system parses the number of the input data and the number of the output data in the first parameter and the second parameter, parses the respective address of the corresponding input data in the first memory and the respective address of the corresponding output data in the first memory in the buffer according to the number of the input data and the number of the output data, finds the input parameter data required to execute the program, and executes the program, and puts the output data obtained after the program has processed the input data into the area in the buffer specified by the respective address of the corresponding output data in the first memory, so that the execution of the program is completed.

Figure 8:
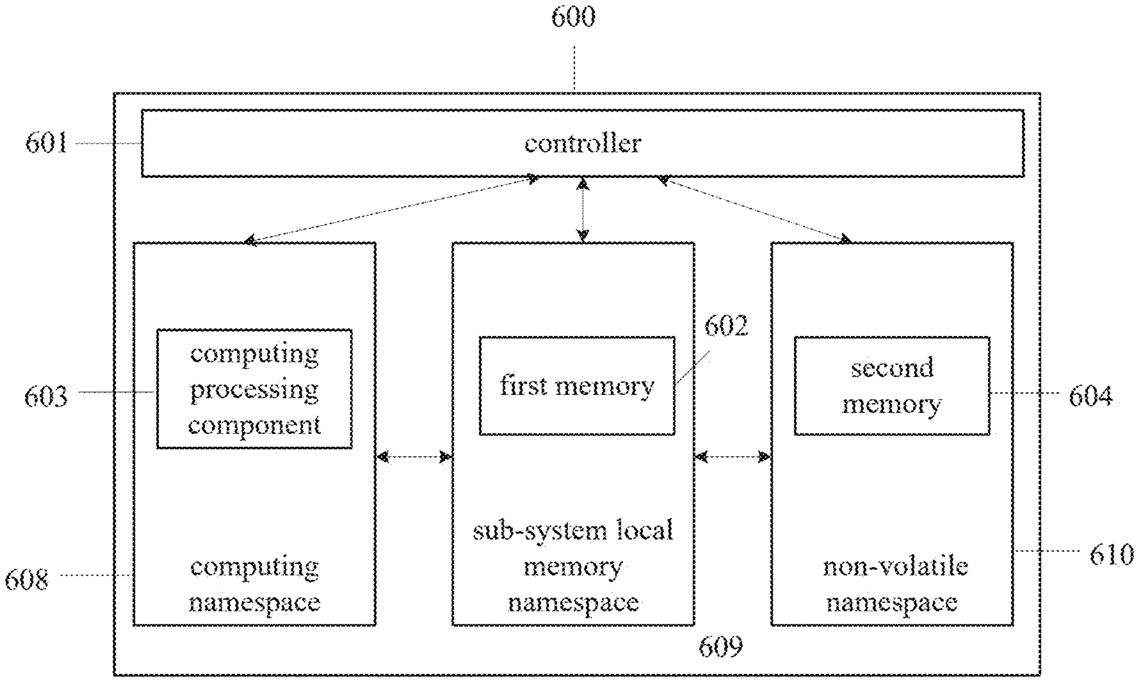
FIG. 8 is a third schematic structural diagram of a computational storage system according to an example of the present disclosure.

In some examples, as shown in FIG. 8, the computational storage system 600 includes a non-volatile namespace 610 including the second memory 604, a computing namespace 608 including the computing processing component 603, and a sub-system local memory namespace 609 including the first memory 602.

The solution provided by the examples of the present disclosure does not need to apply for the program unique identifier of the program, and through a universal command format, the host can communicate with the controller and execute the program, the universal manner is more in line with the idea of standardization, the complexity of implementing the host and the computational storage system can be reduced, thereby improving the efficiency of programs from development to running in the computing processing components.

Figure 9:
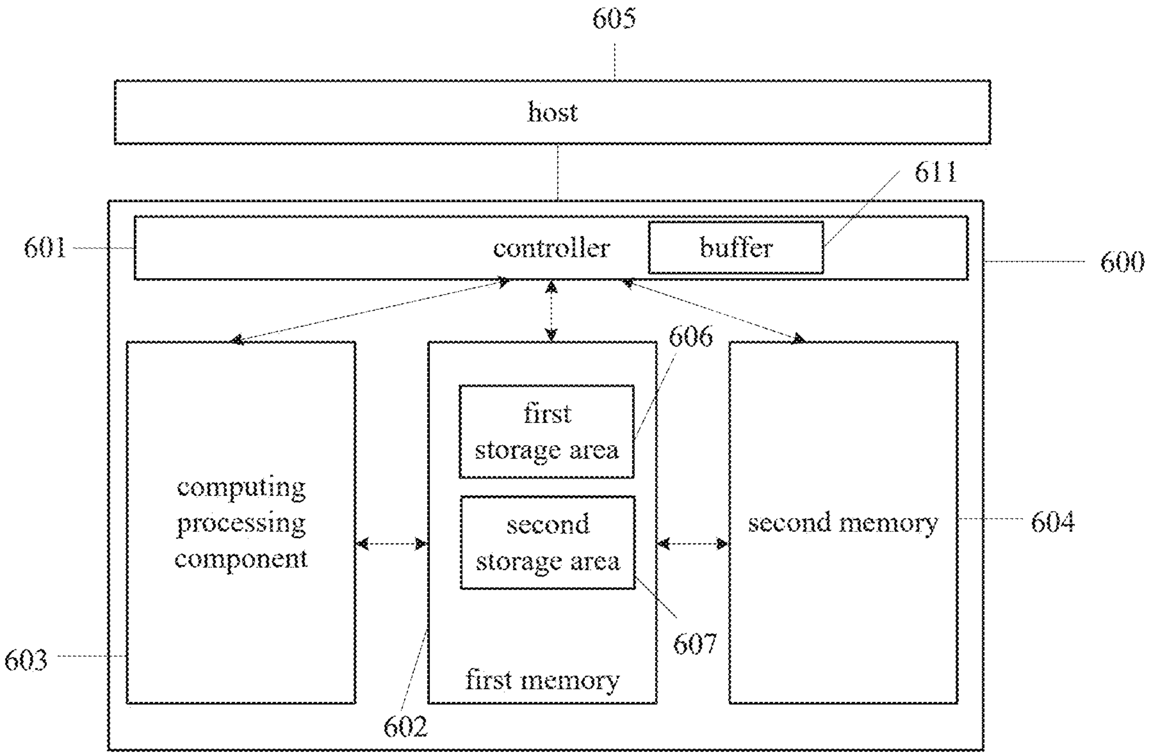
FIG. 9 is a second schematic structural diagram of an electronic system according to an example of the present disclosure.

Based on the foregoing computational storage system, an example of the present disclosure further provides an electronic system, as shown in FIG. 9, the electronic system includes a host 605 and a computational storage system 600 coupled to the host 605. The computational storage system 600 includes a controller 601, a first memory 602 coupled to the controller 601, and a computing processing component 603 configured to execute a program. The host 605 is configured to send a command, where the command instructs the computing processing component 603 to execute a program, and the command defines association information of a respective address of at least one of input data or output data in the process of executing the program in the first memory 602. The controller 601 is configured to receive the command, and obtain the respective address of at least one of input data or output data in the process of executing the program in the first memory 602 from the host 605 according to the association information.

As shown in FIG. 9, the first memory 602 includes a first storage area 606 configured for input data in the process of executing the program by the computing processing component 603, and a second storage area 607 configured for output data in the process of executing the program by the computing processing component 603.

As shown in FIG. 9, the host 605 includes a buffer 611, which is a volatile memory including, but not limited to, a random access memory, a dynamic random access memory, a static random access memory, a synchronous dynamic random access memory, and a double data rate synchronous dynamic random access memory.

In some examples, the command carries first pointer information and at least one of a first parameter or a second parameter. The first parameter includes the number of input data in the process of executing the program, and the second parameter includes the number of output data in the process of executing the program. The first pointer information points to a first area in a buffer in the host 605, and a respective address of each input data in the first memory 602 and a respective address of each output data in the first memory 602 are stored in the first area.

In some examples, the controller 601 is configured to obtain at least one of the respective address of each input data in the process of executing the program in the first memory 602 or the respective address of each output data in the process of executing the program in the first memory 602 from the buffer of the host 605 according to the first pointer information and at least one of the first parameter or the second parameter.

In some examples, the host 605 is configured to store the respective address of each input data in the process of executing the program in the first memory 602 and the respective address of each output data in the process of executing the program in the first memory 602 in the first area sequentially according to a first preset order. The controller 601 is configured to obtain at least one of the respective address of input data in the process of executing the program in the first memory 602 or the respective address of output data in the process of executing the program in the first memory 602 from the host 605 according to a capacity size of the buffer occupied by each of the respective addresses of each input data and each output data in the first memory 602, information about the first preset order, the number of input data, and the number of output data.

In some examples, the host 605 is configured to store the respective addresses of each input data and each output data in the process of executing the program in the first memory 602 in the first area in the buffer of the host 605 sequentially according to an order in which the respective address of the input data in the first memory 602 is stored first and the respective address of the output data in the first memory 602 is stored later.

In some examples, the host 605 is configured to store the respective addresses of each input data and each output data in the process of executing the program in the first memory 602 in the first area in the buffer of the host 605 sequentially according to an order in which the respective address of the output data in the first memory 602 is stored first and the respective address of the input data in the first memory 602 is stored later.

In some examples, the command carries second pointer information. The second pointer information points to a second area in the buffer in the host 605. The second area stores the number of input data, a respective address of each input data in the first memory 602, the number of output data, and a respective address of each output data in the first memory 602.

In some examples, the host 605 is configured to store the number of input data in the process of executing the program, a respective address of each input data in the first memory 602, the number of output data in the process of executing the program, and a respective address of each output data in the first memory 602 in the second area sequentially according to a second preset order. In some examples, the controller 601 is configured to obtain at least one of the respective address of input data in the process of executing the program in the first memory 602 or the respective address of output data in the process of executing the program in the first memory 602 from the host 605 according to capacity sizes of the buffer occupied by each of the number of input data, the respective address of each input data in the first memory 602, the number of output data, and the respective address of each output data in the first memory 602, information about the second preset order, the number of input data, and the number of output data.

In some examples, the host 605 is configured to determine at least one of the number of input data in the process of executing the program or the number of output data in the process of executing the program according to functional characteristics of the program.

In some examples, the command carries at least one of third pointer information or fourth pointer information. The third pointer information points to a third area in the buffer in the host 605. The third area stores a respective address of each input data in the process of executing the program in the first memory 602. The fourth pointer information points to a fourth area in the buffer, and the fourth area stores a respective address of each output data in the process of executing the program in the first memory 602.

In some examples, the controller 601 is configured to obtain the respective address of input data in the process of executing the program in the first memory 602 from the host 605 according to the address stored in the third area. In some examples, the controller 601 is configured to obtain the respective address of output data in the process of executing the program in the first memory 602 from the host 605 according to the address stored in the fourth area.

In some examples, a capacity size of the buffer occupied by a respective address of each input data in the first memory 602 is the same and is a first value, a capacity size of the buffer occupied by a respective address of each output data in the first memory 602 is the same and is a second value, and the first value is equal to the second value.

In some examples, a respective address of each input data/output data in the first memory 602 includes information about the first memory 602 to which an area storing respective input data/output data belongs, a size of the input data/output data, and a starting address of the input data/output data in the first memory 602.

In some examples, the computing processing component 603 is configured to: read input data in a respective area of the first memory 602 according to a respective address of input data in the process of executing the program in the first memory 602, and execute the program; and store output data obtained after the program has processed the input data into the respective area of the first memory 602 according to a respective address of output data in the process of executing the program in the first memory 602.

In some examples, the command further carries a first identifier. In some examples, the controller 601 is configured to obtain, based on a value of the first identifier being a third value, a respective address of input data in the process of executing the program in the first memory 602 and a respective address of output data in the process of executing the program in the first memory 602 according to the association information of respective addresses of the input data and the output data in the process of executing the program in the first memory 602 defined by a program unique identifier carried in the command. In some examples, the controller 601 is configured to obtain, based on a value of the first identifier being a fourth value, a respective address of input data in the process of executing the program in the first memory 602 and a respective address of output data in the process of executing the program in the first memory 602 from the host 605 according to the association information of respective addresses of the input data and the output data in the process of executing the program in the first memory 602 defined by the command.

In some examples, the computational storage system 600 further includes a second memory coupled to the controller 601. The controller 601 is configured to write input data in the process of executing the program stored in the second memory into the first memory 602. The controller 601 is configured to write output data in the process of executing the program stored in the first memory 602 into the second memory.

In some examples, the computational storage system 600 includes a non-volatile namespace including the second memory, a computing namespace including the computing processing component 603, and a sub-system local memory namespace including the first memory 602.

Further details about the above electronic system are described in detail in the above examples of the computational storage system, and details are not described herein again for brevity.

Figure 10:
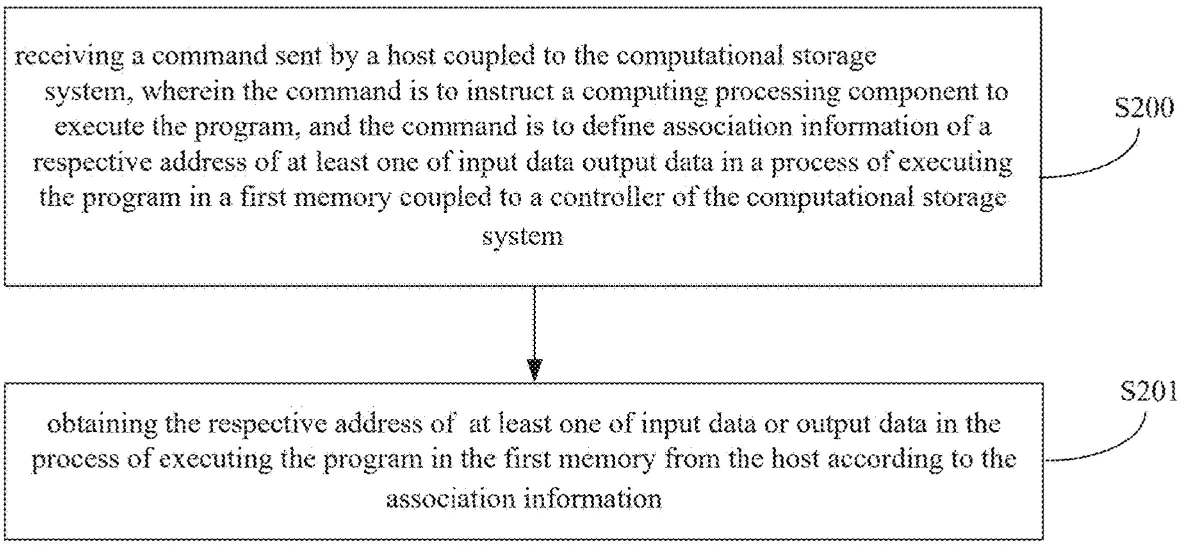
FIG. 10 is a schematic flowchart of an operation method for a computational storage system according to an example of the present disclosure.

Based on the above computational storage system, an example of the present disclosure further provides a method of operating a computational storage system. As shown in FIG. 10, the method includes operations S200 and S201. At operation S200, a command sent by a host coupled to the computational storage system is received. The command instructs a computing processing component to execute a program, and the command defines association information of a respective address of at least one of input data or output data in a process of executing the program in a first memory coupled to a controller of the computational storage system.

At operation S201, the respective address of at least one of input data or output data in the process of executing the program in the first memory may be obtained from the host according to the association information.

In some examples, the command carries first pointer information and at least one of a first parameter or a second parameter. The first parameter includes the number of input data in the process of executing the program, and the second parameter includes the number of output data in the process of executing the program. The first pointer information points to a first area in a buffer in the host. A respective address of each input data in the first memory and a respective address of each output data in the first memory are stored in the first area. A respective address of each input data in the process of executing the program in the first memory and a respective address of each output data in the process of executing the program in the first memory are sequentially stored in the first area according to a first preset order.

In some examples, obtaining the respective address of at least one of input data or output data in the process of executing the program in the first memory from the host according to the association information includes: obtaining at least one of the respective address of each input data in the process of executing the program in the first memory or the respective address of each output data in the process of executing the program in the first memory from the buffer of the host according to the first pointer information and at least one of the first parameter or the second parameter.

In some examples, obtaining the respective address of at least one of input data or output data in the process of executing the program in the first memory from the host according to the association information includes: obtaining at least one of the respective address of input data in the process of executing the program in the first memory or the respective address of output data in the process of executing the program in the first memory from the host according to a capacity size of the buffer occupied by each of the respective address information of each input data and each output data in the first memory, information about the first preset order, the number of input data, and the number of output data.

In some examples, the first preset order includes: an order in which the respective address of the input data in the first memory is stored first and the respective address of the output data in the first memory is stored later; or an order in which the respective address of the output data in the first memory is stored first and the respective address of the input data in the first memory is stored later.

In some examples, the command carries second pointer information; the second pointer information points to a second area in the buffer in the host; the second area stores the number of input data, a respective address of each input data in the first memory, the number of output data, and a respective address of each output data in the first memory. The number of input data in the process of executing the program, a respective address of each input data in the first memory, the number of output data in the process of executing the program, and a respective address of each output data in the first memory are sequentially stored into the second area according to a second preset order.

In some examples, obtaining the respective address of at least one of input data or output data in the process of executing the program in the first memory from the host according to the association information includes: obtaining at least one of the respective address of input data in the process of executing the program in the first memory or the respective address of output data in the process of executing the program in the first memory from the host according to capacity sizes of the buffer occupied by each of the number of input data, the respective address of each input data in the first memory, the number of output data, and the respective address of each output data in the first memory, information about the second preset order, the number of input data, and the number of output data.

In some examples, the operation method further includes: determining at least one of the number of input data in the process of executing the program or the number of output data in the process of executing the program according to functional characteristics of the program.

In some examples, the command carries at least one of third pointer information or fourth pointer information; the third pointer information points to a third area in the buffer in the host, the third area stores a respective address of each input data in the process of executing the program in the first memory; the fourth pointer information points to a fourth area in the buffer, and the fourth area stores a respective address of each output data in the process of executing the program in the first memory; obtaining the respective address of at least one of input data or output data in the process of executing the program in the first memory from the host according to the association information includes at least one of: obtaining the respective address of input data in the process of executing the program in the first memory from the host according to the address stored in the third area; or obtaining the respective address of output data in the process of executing the program in the first memory from the host according to the address stored in the fourth area.

In some examples, a capacity size of the buffer occupied by a respective address of each input data in the first memory is the same and is a first value, a capacity size of the buffer occupied by a respective address of each output data in the first memory is the same and is a second value, and the first value is equal to the second value.

In some examples, a respective address of each input data/output data in the first memory includes information about the first memory to which an area storing respective input data/output data belongs, a size of the input data/output data, and a starting address of the input data/output data in the first memory.

The operation method of the computational storage system mentioned in the above examples is described in detail in the above examples related to the computational storage system, and details are not described herein again for brevity.

Based on the above operation method of the above computational storage system, an example of the present disclosure further provides a computer-readable storage medium, where the computer-readable storage medium stores a computer program, and the computer program, when executed by a processor, implements the operation method of the computational storage system according to any one of the above examples.

Herein, all or part of the processes in the operation method of the computational storage system in the above examples are implemented by using a computer program for instructing related hardware, and the program may be stored in a computer-readable storage medium, and when the program is executed, the program may include the processes of the examples of the above methods. The storage medium may be a Ferromagnetic random access memory (FRAM), a read-only memory (ROM), a programmable read-only memory (PROM), an erasable programmable read-only memory (EPROM), an electrically erasable programmable read-only memory (EEPROM), a flash memory, a magnetic surface memory, an optical disc, or a compact disc read-only memory (CD-ROM), and the like; and the storage medium may further include a combination of the above types of memories.

The features disclosed in the several apparatus examples provided by the present disclosure may be arbitrarily combined without conflict to obtain a new apparatus example.

The method disclosed in the several method examples provided by the present disclosure may be arbitrarily combined without conflict to obtain a new method example.

The above description is only an example of the present disclosure, but the protection scope of the present disclosure is not limited thereto, and changes or replacements that may be easily conceived by any person skilled in the art within the technical scope of the present disclosure should be covered within the protection scope of the present disclosure.

What is claimed is:

1. An electronic system, comprising:
- a host; and
- a computational storage system coupled to the host and comprising:
  - a controller;
  - a first memory coupled to the controller; and
  - a computing processing component configured to execute a program,
- wherein the host is configured to send a command, the command instructing the computing processing component to execute the program, the command defining association information indicating one or more respective addresses of input data or output data for use in executing the program in the first memory, and the association information comprises pointer information that points to an area in a buffer in the host that stores the one or more respective addresses of the input data or output data, and wherein the controller is configured to:

receive the command; and obtain, from the area in the buffer in the host pointed to by the pointer information, the one or more respective addresses of input data or output data.

2. The electronic system of claim 1, wherein:

the command carries first pointer information and at least one of a first parameter or a second parameter, the first parameter comprises a number of input data for use in executing the program, the second parameter comprises a number of output data for use in executing the program, the first pointer information points to a first area in the buffer in the host, and one or more first respective addresses of each input data in the first memory and one or more second respective addresses of each output data are stored in the first area.

3. The electronic system of claim 2, wherein the controller is configured to:

obtain at least one first respective address of each input data for use in executing the program in the first memory or at least one second respective address of each output data for use in executing the program in the first memory from the buffer of the host according to the first pointer information and the at least one of first parameter or the second parameter.

4. The electronic system of claim 2, wherein:

the host is configured to:

store the one or more first respective addresses of each input data for use in executing the program in the first memory and the one or more second respective addresses of each output data for use in executing the program in the first memory into the first area sequentially according to a first preset order, and the controller is configured to:

obtain at least one of the one or more first respective addresses of input data for use in executing the program in the first memory or the one or more second respective addresses of output data for use in executing the program in the first memory from the host according to a capacity size of the buffer occupied by each of the one or more first respective addresses or the one or more second respective addresses in the first memory, information about the first preset order, the number of input data, and the number of output data.

5. The electronic system of claim 4, wherein the host is configured to:

store the one or more first respective addresses of each input data and the one or more second respective addresses of each output data for use in executing the program in the first memory into the first area in the buffer of the host sequentially according to an order in which the one or more first respective addresses of the input data in the first memory is stored first and the one or more second respective addresses of the output data in the first memory is stored later; or store the one or more first respective addresses of each input data and the one or more second respective addresses of each output data for use in executing the program in the first memory into the first area in the buffer of the host sequentially according to an order in which the one or more second respective addresses of the output data in the first memory is stored first and the one or more first respective addresses of the input data in the first memory is stored later.

6. The electronic system of claim 2, wherein the host is configured to:

determine at least one of the number of input data for use in executing the program or the number of output data for use in executing the program according to functional characteristics of the program.

7. The electronic system of claim 2, wherein:

a capacity size of the buffer occupied by the one or more first respective addresses of each input data in the first memory is the same and is a first value, a capacity size of the buffer occupied by the one or more second respective addresses of each output data in the first memory is the same and is a second value, and the first value is equal to the second value.

8. The electronic system of claim 2, wherein the one or more first respective addresses of each input data and the one or more second respective addresses of each output data in the first memory comprises information about the first memory to which an area storing respective input data and respective output data belongs, a size of the input data and the output data, and a starting address of the input data/output data and the output data in the first memory.

9. The electronic system of claim 1, wherein:

the command carries second pointer information, the second pointer information points to a second area in the buffer in the host, and the second area stores a number of input data, one or more first respective addresses of each input data in the first memory, a number of output data, and one or more second respective addresses of each output data in the first memory.

10. The electronic system of claim 9, wherein:

the host is configured to:

store the number of input data for use in executing the program, the one or more first respective addresses of each input data in the first memory, the number of output data for use in executing the program, and the one or more second respective addresses of each output data in the first memory into the second area sequentially according to a second preset order; and the controller is configured to:

obtain at least one of the one or more first respective addresses of input data for use in executing the program in the first memory or the one or more second respective addresses of output data for use in executing the program in the first memory from the host according to capacity sizes of the buffer occupied by each of the number of input data, the one or more first respective addresses of each input data in the first memory, the number of output data, the one or more second respective addresses of each output data in the first memory, information about the second preset order, the number of input data, and the number of output data.

11. The electronic system of claim 1, wherein:

the command carries at least one of third pointer information or fourth pointer information, the third pointer information points to a third area in the buffer in the host, the third area stores one or more first respective addresses of each input data for use in executing the program in the first memory, the fourth pointer information points to a fourth area in the buffer, the fourth area stores one or more second respective addresses of each output data for use in executing the program in the first memory, and the controller is configured to:

obtain the one or more first respective addresses of input data from the third area; or obtain the one or more second respective addresses of output data from the fourth area.

12. The electronic system of claim 1, wherein the computing processing component is configured to:

read input data in a first respective area of the first memory according to a first respective address of input data for use in executing the program in the first memory; and store output data obtained after the program has processed the input data into a second respective area of the first memory according to a second respective address of output data for use in executing the program in the first memory.

13. The electronic system of claim 1, wherein:

the command further carries a first identifier, and the controller is configured to:

obtain, based on a value of the first identifier being a third value, a first respective address of input data for use in executing the program in the first memory and a second respective address of output data for use in executing the program in the first memory according to the association information of the one or more respective addresses of the input data and the output data for use in executing the program in the first memory defined by a program unique identifier carried in the command; or obtain, based on a value of the first identifier being a fourth value, the first respective address of input data for use in executing the program in the first memory and the second respective address of output data for use in executing the program in the first memory from the host according to the association information of the one or more respective addresses of the input data and the output data for use in executing the program in the first memory defined by the command.

14. The electronic system of claim 1, wherein:

the computational storage system further comprises a second memory coupled to the controller, and the controller is configured to:

write the input data for use in executing the program stored in the first memory from the second memory into the first memory; and write the output data for use in executing the program stored in the first memory from the first memory into the second memory.

15. The electronic system of claim 14, wherein the computational storage system comprises:

a non-volatile namespace comprising the second memory;

a computing namespace comprising the computing processing component; and a sub-system local memory namespace comprising the first memory.

16. A computational storage system, comprising:

a first memory;

a computing processing component configured to execute a program; and a controller coupled to the first memory and configured to:

receive a command sent by a host coupled to the computational storage system, the command instructing the computing processing component to execute the program, the command defining association information indicating one or more respective addresses of at least one of input data or output data for use in executing the program in the first memory, and the association information comprises pointer information that points to an area in a buffer in the host that stores the one or more respective addresses of the at least one of input data or output data; and obtain, from the area in the buffer in the host pointed to by the pointer information, the one or more respective addresses of at least one of input data or output data.

17. The computational storage system of claim 16, wherein:

the command carries first pointer information and at least one of a first parameter or a second parameter, the first parameter comprises a number of input data for use in executing the program, the second parameter comprises a number of output data for use in executing the program, the first pointer information points to a first area in the buffer in the host, a respective address of each input data in the first memory and a respective address of each output data are stored in the first area, one or more first respective addresses of each input data for use in executing the program in the first memory and one or more second respective addresses of each output data for use in executing the program in the first memory are sequentially stored in the first area according to a first preset order, the controller is configured to:

obtain at least one of the one or more first respective addresses of each input data for use in executing the program in the first memory or the one or more second respective addresses of each output data for use in executing the program in the first memory from the buffer of the host according to the first pointer information and at least one of the first parameter or the second parameter; or obtain at least one of the one or more first respective addresses of input data for use in executing the program in the first memory or the one or more second respective addresses of output data for use in executing the program in the first memory from the host according to a capacity size of the buffer occupied by each of the one or more first respective addresses of each input data and the one or more second respective addresses of each output data in the first memory, information about the first preset order, the number of input data, and the number of output data, and the host is configured to:

determine at least one of the number of input data for use in executing the program or the number of output data for use in executing the program according to functional characteristics of the program.

18. The computational storage system of claim 16, wherein:

the command carries second pointer information, the second pointer information points to a second area in the buffer in the host, the second area stores a number of input data, one or more first respective addresses of each input data in the first memory, a number of output data, and one or more second respective addresses of each output data in the first memory, the number of input data for use in executing the program, the one or more first respective addresses of each input data in the first memory, the number of output data for use in executing the program, and the one or more second respective addresses of each output data in the first memory are sequentially stored into the second area according to a second preset order, and the controller is configured to:

obtain at least one of the one or more first respective addresses of input data for use in executing the program in the first memory or the one or more second respective addresses of output data for use in executing the program in the first memory from the host according to capacity sizes of the buffer occupied by each of the number of input data, the one or more first respective addresses of each input data in the first memory, the number of output data, the one or more second respective addresses of each output data in the first memory, information about the second preset order, the number of input data, and the number of output data.

19. The computational storage system of claim 16, wherein:

the command carries at least one of third pointer information or fourth pointer information, the third pointer information points to a third area in the buffer in the host, the third area stores one or more first respective addresses of each input data for use in executing the program in the first memory, the fourth pointer information points to a fourth area in the buffer, the fourth area stores one or more second respective addresses of each output data for use in executing the program in the first memory, and the controller is configured to:

obtain the one or more first respective addresses of input data from the third area; or obtain the one or more second respective addresses of output data from the fourth area.

20. A method of operating a computational storage system, comprising:

receiving a command sent by a host coupled to the computational storage system, the command instructing a computing processing component to execute a program, the command defining association information indicating one or more respective addresses of at least one of input data or output data in a process of executing the program in a first memory coupled to a controller of the computational storage system, and the association information comprises pointer information that points to an area in a buffer in the host that stores one or more respective addresses of the at least one of input data or output data; and obtaining, from the area in the buffer in the host pointed to by the pointer information, the one or more respective addresses of at least one of input data or output data for use in executing the program in the first memory from the host according to the association information.

* * * * *